(12) United States Patent
Wakako et al.

(10) Patent No.: US 10,984,230 B2
(45) Date of Patent: Apr. 20, 2021

(54) MONITORING VIDEO ANALYSIS SYSTEM AND MONITORING VIDEO ANALYSIS METHOD

(71) Applicant: Panasonic i-PRO Sensing Solutions Co., Ltd., Fukuoka (JP)

(72) Inventors: Takeshi Wakako, Kanagawa (JP); Yasuo Yomogida, Fukuoka (JP); Youhei Koide, Fukuoka (JP)

(73) Assignee: Panasonic i-PRO Sensing Solutions Co., Ltd., Fukuoka (JP)

( * ) Notice: Subject to any disclaimer, the term of this patent is extended or adjusted under 35 U.S.C. 154(b) by 174 days.

(21) Appl. No.: 15/659,277

(22) Filed: Jul. 25, 2017

(65) Prior Publication Data
US 2018/0101723 A1 Apr. 12, 2018

(30) Foreign Application Priority Data
Oct. 7, 2016 (JP) .............................. JP2016-199561

(51) Int. Cl.
| | | |
|---|---|---|
| *G06K 9/00* | (2006.01) | |
| *G06K 9/20* | (2006.01) | |
| *G06T 7/70* | (2017.01) | |
| *G06K 9/46* | (2006.01) | |
| *H04N 7/18* | (2006.01) | |

(52) U.S. Cl.
CPC ..... *G06K 9/00362* (2013.01); *G06K 9/00201* (2013.01); *G06K 9/00228* (2013.01); *G06K 9/00261* (2013.01); *G06K 9/00288* (2013.01); *G06K 9/00711* (2013.01); *G06K 9/20* (2013.01); *G06K 9/2081* (2013.01); *G06K 9/46* (2013.01); *G06T 7/70* (2017.01); *H04N 7/185* (2013.01); *G06T 2200/04* (2013.01)

(58) Field of Classification Search
None
See application file for complete search history.

(56) References Cited

U.S. PATENT DOCUMENTS

| | | | | |
|---|---|---|---|---|
| 2004/0117358 | A1* | 6/2004 | von Kaenel | G06Q 40/08 |
| 2004/0145657 | A1 | 7/2004 | Yamamoto et al. | |
| 2007/0226651 | A1* | 9/2007 | Zerba | G06Q 30/02 715/835 |

(Continued)

FOREIGN PATENT DOCUMENTS

| | | |
|---|---|---|
| JP | 2004-032459 A | 1/2004 |
| JP | 2008-197837 A | 8/2008 |

(Continued)

OTHER PUBLICATIONS

Japanese Notice of Reasons for Refusal dated Jun. 16, 2020 for the corresponding Japanese Patent Application No. 2016-199561, 7 pages (With English machine translation).

*Primary Examiner* — Jiangeng Sun
(74) *Attorney, Agent, or Firm* — Seed IP Law Group LLP

(57) ABSTRACT

A monitoring video analysis system includes a wearable camera and a back end server that receives video data files of a captured video. The back end server detects an object appearing in frames constituting the received video data file, for each frame. The back end server stores a position of the object detected for each frame, for each object, as tracking information. The back end server displays the object detected for each frame, on monitor, by using identifiable solid-line border.

7 Claims, 17 Drawing Sheets

(56) References Cited

U.S. PATENT DOCUMENTS

| | | | |
|---|---|---|---|
| 2008/0193018 A1 | 8/2008 | Masuda | |
| 2009/0228841 A1* | 9/2009 | Hildreth | G06F 3/0304 715/863 |
| 2013/0216107 A1* | 8/2013 | Huang | G06K 9/00295 382/118 |
| 2016/0155465 A1* | 6/2016 | Park | G11B 20/005 386/241 |
| 2016/0286156 A1* | 9/2016 | Kovac | H04N 5/772 |
| 2017/0039419 A1* | 2/2017 | Shiiyama | G06K 9/00926 |
| 2017/0076572 A1* | 3/2017 | Rao | H04N 5/91 |
| 2017/0161561 A1* | 6/2017 | Marty | G06K 9/00724 |

FOREIGN PATENT DOCUMENTS

| | | | |
|---|---|---|---|
| JP | 2009-081635 A | | 4/2009 |
| JP | 2010-021921 A | | 1/2010 |
| JP | 2011-182028 A | | 9/2011 |
| JP | 2016012752 A | * | 1/2016 |
| JP | 2016-158156 A | | 9/2016 |
| KR | 101215948 B1 | * | 12/2012 |

\* cited by examiner

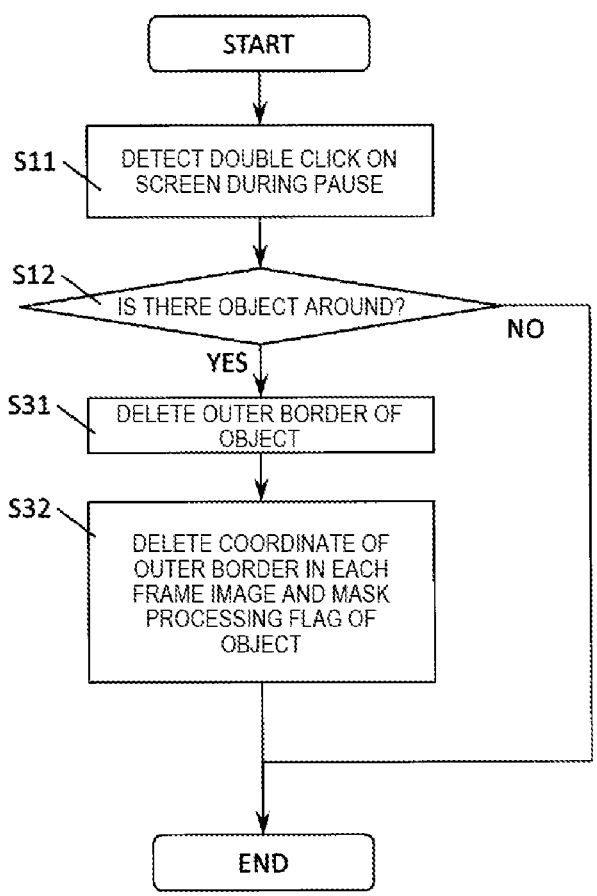

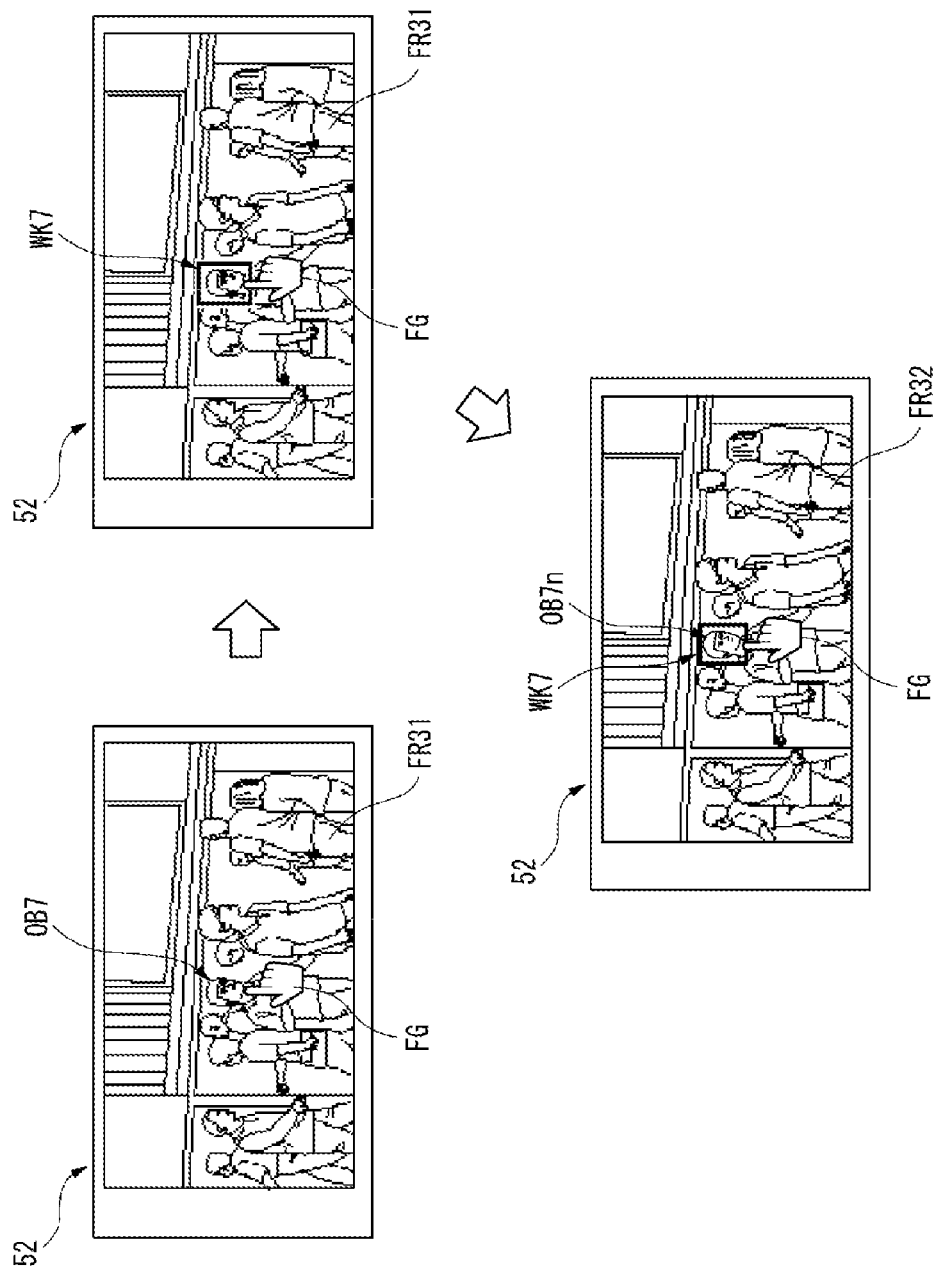

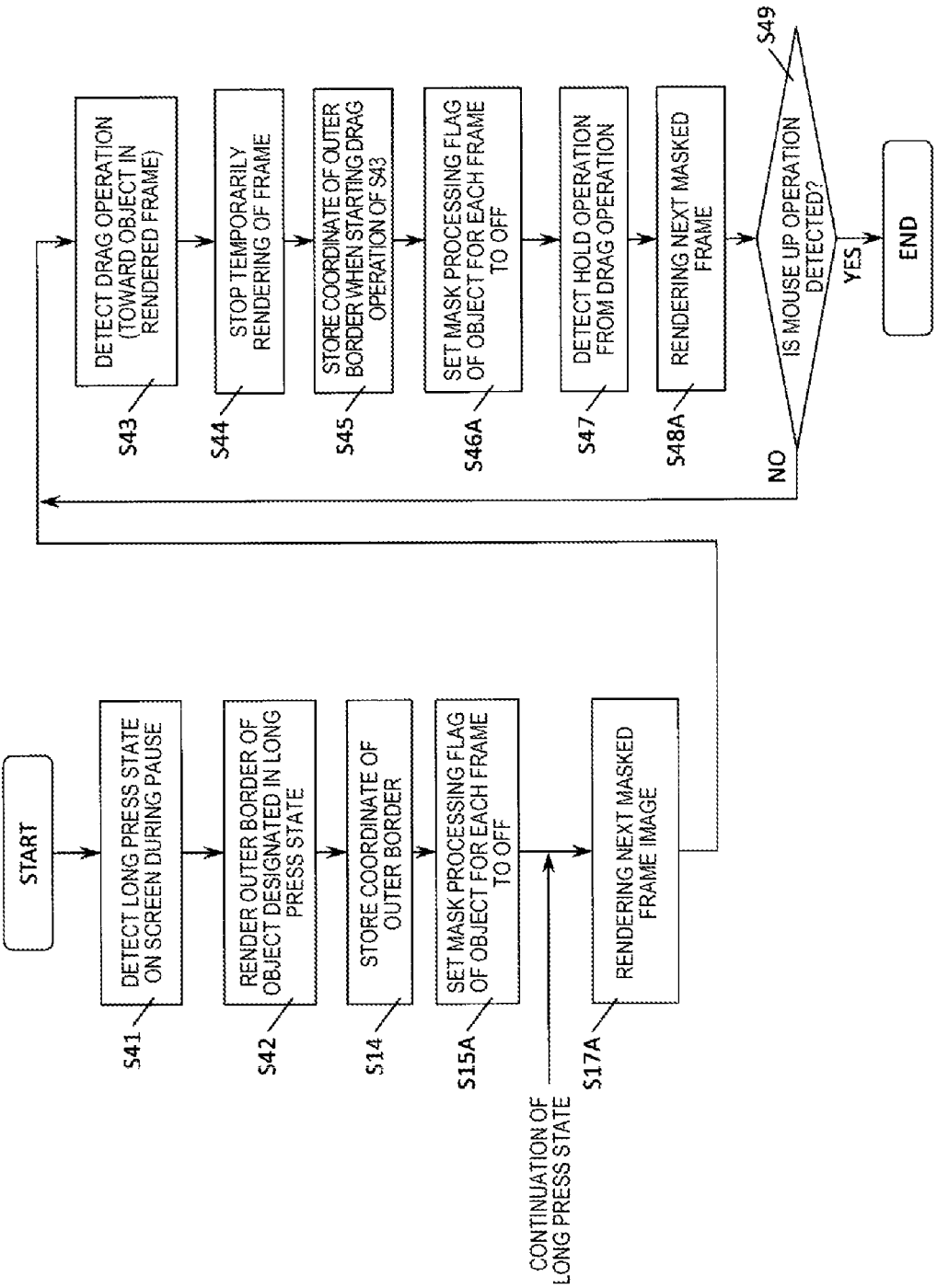

MONITORING VIDEO ANALYSIS SYSTEM AND MONITORING VIDEO ANALYSIS METHOD

BACKGROUND

1. Technical Field

The present disclosure relates to a monitoring video analysis system and a monitoring video analysis method for analyzing a monitoring video captured by an image capturing device.

2. Description of the Related Art

In recent years, for example, an operation method which causes a police officer to hold a wearable camera and records a video captured during patrolling (traveling) into a memory of the wearable camera, is steadily promoted. In particular, in the United States, due to incidents caused by a police officer on patrol for himself or herself, a mounting rate of the wearable camera has been rapidly increasing. In a case where a suspect appears in a video captured by the wearable camera, the video may be submitted to a court or a public prosecutor's office, and may be used as an evidence for identifying a behavior of the suspect.

In a case where ordinary citizens appear in the video submitted as an evidence, since privacy cannot be protected, and in the United States, it is mandatory to manage the video such that ordinary citizens do not appear in the video captured by the wearable camera.

For this reason, a police officer visually checks whether or not ordinary citizens appear in all frames of the video captured by the wearable camera, and in a case where ordinary citizens appear in a portion, performs mask processing (for example, mosaic processing) on the portion by using a dedicated image processing software.

In addition, in another dedicated image processing software, when a user selects an object (for example, a person's face) to be subjected to mosaic processing in advance, mosaic processing of the selected object, is automatically performed for all frames of the video.

Further, as a technique in the related art for masking an image, a method that, in a case where a movement pattern of a moving object positioned in a mask disable area matches with a preset movement pattern, excludes an image area of the moving object from an area to be masked, and that, in a case where the movement pattern of the moving object does not match with the preset movement pattern, includes the image area of the moving object into the area to be masked, is proposed. For example, such a camera is described in Japanese Patent Unexamined Publication No. 2016-158156.

However, the method is not efficient, in that a police officer performs mosaic processing by checking all frames of the video recorded by the wearable camera one by one. As a result, it makes a user as a police officer work for a long time.

Also, even in a case of automatically performing the mosaic processing using the dedicated image processing software, a user needs to specify and select all necessary objects in advance. For example, since faces of many people are included in a video captured on a street or the like, it takes a long time to select the faces one by one using the image processing software. In addition, when faces of many people are included in the video, even in the case of automatically performing the mosaic processing, it is likely to recognize erroneously objects. As a result, in some cases, the mosaic processing may be performed on a portion not to be masked by erroneous recognition. In such a case, a user has to exclude the erroneously recognized portion from the mosaic processing, and that work also takes time. In a case where unnecessary mosaic processing is not excluded, visibility of the video is deteriorated, and also when the video is submitted to a court, admissibility of evidence of the video is decreased.

Further, even when a configuration described in Japanese Patent Unexamined Publication No. 2016-158156 is used, which portion of the captured video data a mask disable area is set and which movement pattern each person moves with, vary depending on the captured video data. Thus, it is difficult to estimate the mask disable area and the movement pattern in advance. For this reason, there remains a problem that it is difficult to flexibly perform mask processing on a plurality of persons appearing in captured video data.

SUMMARY

The present disclosure has been made in consideration of the above-described circumstances in the art, and an object thereof is to provide a monitoring video analysis system and a monitoring video analysis method capable of supporting reduction of a workload of mask processing while observing privacy protection of an object by flexibly masking the object appearing in a video.

The present disclosure provides a monitoring video analysis system including: a camera that is used by a user; and a server that receives a video captured by the camera, in which the server detects at least one object appearing in each frame image constituting the received video for each frame image, stores a position of at least one object detected for each frame image, for each object, and displays at least one object detected for each frame image, on a monitor, in an identifiable first display mode.

Further, the present disclosure provides a monitoring video analysis method of a monitoring video analysis system including a camera that is used by a user and a server that receives a video captured by the camera, the method causing the server to: receive a video captured by the camera; detect at least one object appearing in each frame image constituting the received video for each frame image; store a position of at least one object detected for each frame image, for each object; and display at least one object detected for each frame image, on a monitor, in an identifiable first display mode.

According to the present disclosure, it is possible to support reduction of a workload of the mask processing while observing privacy protection of an object by flexibly masking the object appearing in a video.

BRIEF DESCRIPTION OF THE DRAWINGS

FIG. 12B is a flowchart explaining in detail an example of an operation procedure of the back end server when completely deleting objects corresponding to FIG. 10;

FIG. 15 is a diagram illustrating a display transition example of a frame image when an object not to be masked is added by the back end server according to a modification example of the third embodiment; and FIG. 16 is a flowchart explaining in detail an example of an operation procedure of the back end server when adding objects corresponding to FIG. 15.

DETAILED DESCRIPTION

Background to Content of First Embodiment

Figure 1:
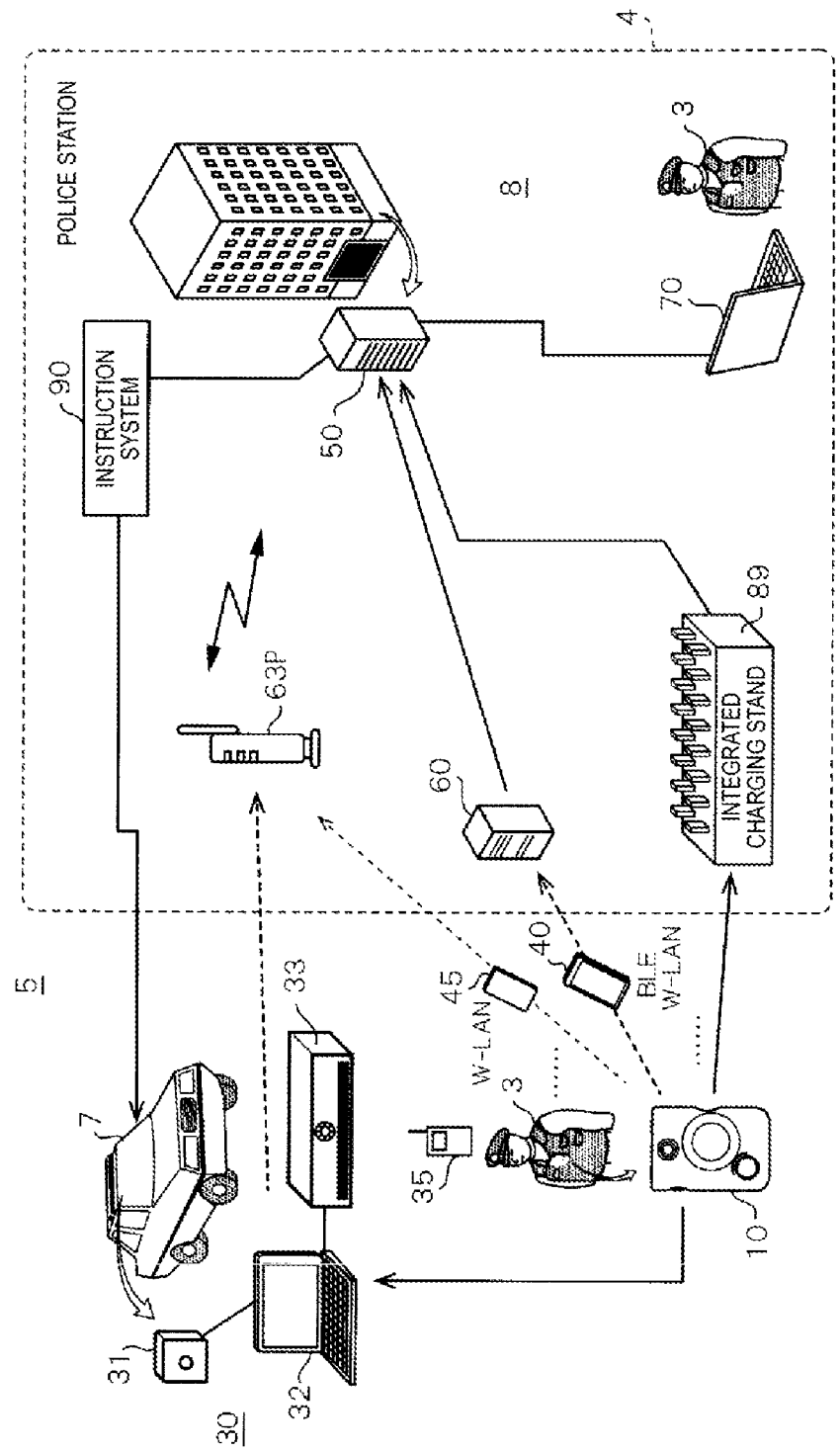
FIG. 1 is an explanatory diagram illustrating an example of an overview of a monitoring video analysis system according to each embodiment.

The above-mentioned method in the related art is not efficient, in that a police officer performs mosaic processing by checking all frames of the video recorded by the wearable camera one by one. As a result, it makes a user as a police officer work for a long time.

Also, even in a case of automatically performing the mosaic processing using the dedicated image processing software, a user needs to specify and select all necessary objects in advance. For example, since faces of many people are included in a video captured on a street or the like, it takes a long time to select the faces one by one using the image processing software. In addition, when faces of many people are included in the video, even in the case of automatically performing the mosaic processing, it is likely to recognize erroneously objects. As a result, in some cases, the mosaic processing may be performed on a portion not to be masked by erroneous recognition. In such a case, a user has to exclude the erroneously recognized portion from the mosaic processing, and that work also takes time. In a case where unnecessary mosaic processing is not excluded, visibility of the video is deteriorated, and also when the video is submitted to a court, admissibility of evidence of the video is decreased.

Further, even when a configuration described in Japanese Patent Unexamined Publication No. 2016-158156 is used, which portion of the captured video data a mask disable area is set and which movement pattern each person moves with, vary depending on the captured video data. Thus, it is difficult to estimate the mask disable area and the movement pattern in advance. For this reason, there remains a problem that it is difficult to flexibly perform mask processing on a plurality of persons appearing in captured video data.

Therefore, in the following first embodiment, an example of a monitoring video analysis system, which supports reduction of a workload of mask processing while observing privacy protection of an object by flexibly masking the object appearing in a video, will be described.

Hereinafter, each embodiment, which specifically discloses a monitoring video analysis system and a monitoring video analysis method according to the present disclosure, will be described in detail with reference to the drawings as appropriate. Here, a detailed explanation more than necessary may be omitted. For example, there is a case where detailed descriptions of well-known matters and redundant explanations for substantially the same configuration may be omitted. This is for avoiding unnecessary redundancy in the following explanation and facilitating understanding by those skilled in the art. The accompanying drawings and the following description are provided such that those skilled in the art can fully understand the present disclosure, and are not intended to limit the scope of the present invention. Further, in the following description, it is assumed that a video is configured with a plurality of frame images (referred simply to as frames in some cases) arranged in time series.

Common Matter of Each Embodiment

FIG. 1 is a diagram illustrating an example of an overview of monitoring video analysis system 5 according to each embodiment. Monitoring video analysis system 5 is configured to include in-car camera system (in-car video system (ICV)) 30 mounted on patrol car 7 (that is, a police patrol car), wearable camera (body-worn camera (BWC)) 10 attached or held on a uniform of police officer 3, and in-police system 8 provided in police station 4.

In-car camera system 30 includes one or more in-car cameras 31, in-car personal computer (PC) 32, and in-car recorder 33, and captures and records a monitoring video based on captured images of an incident or the like occurred while traveling of patrol car 7. One or more in-car cameras 31 includes, for example, a camera provided so as to capture an image of the front of patrol car 7, and one or more cameras provided so as to capture an image of each of the left, the right, and the rear of patrol car 7. In-car PC 32 controls operations of in-car camera 31 and in-car recorder 33 according to an instruction by an operation of police officer 3. In-car recorder 33 records monitoring video data captured by each of the plurality of in-car cameras 31 in time series.

In-car camera system 30 is connected to back end server (BES) 50 of in-police system 8 via wireless LAN access point 63P of in-police system 8 in a wireless manner. In-car camera system 30 can select specific monitoring video data from the monitoring video data recorded in in-car recorder 33, and transmit the selected video data to back end server 50 via wireless LAN access point 63P. In addition, in-car camera system 30 is connected to wearable camera 10 in a communicable manner, and records monitoring video data captured by wearable camera 10 and sound data collected by wearable camera 10, in in-car recorder 33. In the following description, it is assumed that the sound data includes, for example, a sound of a gunshot when a suspect or a criminal fires a possessed gun during patrolling (traveling) or at an incident site or an accident site.

Wearable camera 10 is attached or held on a uniform of police officer 3 as a user, captures a video of a scene in front of police officer 3 as a subject, and transmits the captured monitoring video data and the collected sound data to in-car camera system 30. In this case, wearable camera 10 divides the captured video of the scene into a plurality of files with video data (video data files), and stores the plurality of video data files into a memory. That is, wearable camera 10 records the plurality of video data files in time series by capturing a video for each predetermined time. In the present embodiment, a file format of mpeg4 (MP4) which is suitable for moving image distribution on the Internet is used for the video data file. The file format is not limited to MP4, and may be audio video interleave (AVI), QuickTime, windows media video (WMV), flash video (FLV), or the like.

Hereinafter, it is assumed that a subject to be captured by wearable camera 10 or in-car camera 31 includes not only a person but also a whole view of an incident site or an accident site, a crowd (so-called onlookers) gathered near the site, and a scene near a capturing position. Further, police officer 3 possesses police wireless terminal 35 as an example of a wireless communication terminal that receives an instruction from instruction system 90. Typically, police officer 3 carries police wireless terminal 35 to the site when working outside a police station, such as when patrolling or responding to the scene at the time of occurrence of an incident. In addition, police officer 3 may possess smartphone 40 as an example of a communication terminal which can communicate with wearable camera 10. Smartphone 40 has a telephone function and a wireless communication function, and is used, for example, for an emergency contact from police station 4 or an emergency contact to police station 4. Smartphone 40 is an example of a portable terminal which is widely used.

Wearable camera 10 is connected to back end server 50 directly via in-car camera system 30, or via smartphone 40 or wireless local area network (LAN) access point 45, and thus the monitoring video data and the sound data can be transmitted to back end server 50. Smartphone 40 is connected to back end server 50 via a mobile communication network or the Internet network. Wireless LAN access point 45 is connected to back end server 50 via a wired network or a wireless network (the Internet network or the like). In addition, wearable camera 10 is manually connected to integrated charging stand 68 to be described, and thus the video data and the sound data can be transmitted to back end server 50.

In-police system 8 is configured to include back end server 50, back end streaming server (BSS) 60, back end client (BEC) 70, wireless LAN access point 63, integrated charging stand 68, and instruction system 90, which are provided in police station 4.

Back end server 50 is configured to include a computer and a storage, and manages evidence video (monitoring video) data of an incident. Back end server 50 has a face recognition function of recognizing a face in an image frame constituting the monitoring video captured by, for example, wearable camera 10 or in-car camera 31, and has a sound recognition function of recognizing the sound data included in segment data (refer to an explanation to be described) transmitted from wearable camera 10 or in-car camera system 30. In addition, back end server 50 includes a sound database (not illustrated) in which preset sound data related to patrols and incidents or accidents (that is, sound data which is likely to occur during patrolling and at an incident site or an accident site) is registered. The preset sound data related to patrols or incidents includes, for example, a sound of a gunshot when a suspect or a police officer fires a gun, a voice uttered by a police officer who is previously instructed to utter words at the time of feeling danger during patrolling or when an incident occurs, and sound data such as a sound when a police officer falls to the ground or the like (for example "thud"). Back end server 50 performs sound recognition on the sound data included in the segment data (refer to an explanation to be described) transmitted from in-car camera system 30 or wearable camera 10, and compares a sound obtained by the sound recognition with a sound registered in the sound database. The storage that stores the sound database may be provided inside police station 4, or may be provided outside police station 4 as long as back end server 50 can access the storage.

Back end streaming server 60 receives video data which is distributed from wearable camera 10 in a streaming manner, and transmits the received video data to back end server 50. In addition, back end streaming server 60 may receive video data which is distributed from in-car camera system 30 in a streaming manner, and transmit the received video data to back end server 50.

Back end client 70 is configured with, for example, a PC, accesses a suspicious person database (not illustrated) of back end server 50, searches information on an incident such as criminals, and displays the searched result on a display device (for example, a liquid crystal display (LCD) provided in advance in back end client 70) by using a browser or a dedicated application which can display information. In the suspicious person database, for example, a person on the wanted list or a criminal in the past is registered in advance in correlation with information identifying an incident (for example, an incident number). In addition, back end client 70 can access a sound database of back end server 50, and search information on an incident such as criminals. Back end client 70 may be provided not only inside police station 4 but also outside police station 4. Further, back end client 70 may be any one of a thin client PC and a rich client PC.

Wireless LAN access point 63 is connected to in-car camera system 30 and wearable camera 10 via a wireless LAN (W-LAN) in a wireless manner, and transmits the monitoring video data and the sound data recorded in in-car camera system 30 and the monitoring video data and the sound data recorded in wearable camera 10, to back end server 50.

Integrated charging stand 68 can hold wearable camera 10 which is held or possessed by each of a plurality of police officers 3, charges power of each wearable camera 10 which is held, and performs wired communication with wearable camera 10. In addition, integrated charging stand 68 has a function of transmitting the monitoring video data and the sound data stored in wearable camera 10 to back end server 50. Further, integrated charging stand 68 is connected to back end server 50 via a Universal Serial Bus (USB) cable in a wired manner.

Instruction system 90 includes a police wireless base station apparatus (not illustrated) as an example of a wireless communication apparatus, is connected to back end server 50, and transmits an instruction to each police department under the control of police station 4. Police station 4 is provided with a police wireless system for transmitting an instruction to each police officer. In a case where an incident occurs, for example, based on an instruction from back end server 50, instruction system 90 transmits various dispatch instructions such as emergency dispatch to a site, protection of a site, arrest of a suspect, or support for police officers arrived at the site, to patrol car 7 which is to be dispatched to the incident site and on which the police officer rides, or police wireless terminal 35 possessed by the police officer, in a wireless manner. Instruction system 90 may output an instruction to a police officer to be dispatched to the incident site, according to an instruction which is input from a police officer. In addition, instruction system 90 may be not directly connected to back end server 50. In this case, when an incident occurs, independently of back end server 50, instruction system 90 may transmit the above-mentioned various dispatch instructions, from the police wireless base station apparatus, to patrol car 7 to be dispatched to the incident site or police wireless terminal 35, in a wireless manner.

In monitoring video analysis system 5, in a case where in-car camera system 30 is used, wearable camera 10 is connected to in-car camera system 30 so as to perform data transmission by short-range wireless communication or wired communication using a signal cable such as a USB cable. The monitoring video data captured by wearable camera 10 and the sound data collected by wearable camera 10 are transmitted to in-car camera system 30. In-car camera system 30 reproduces the monitoring video data and the sound data, performs video recording of the monitoring video data, or performs sound recording of the sound data. The monitoring video data and the sound data are transmitted to back end server 50.

In-car camera system 30 records the monitoring video data captured by in-car camera 31, the monitoring video data captured by wearable camera 10, and the sound data collected by wearable camera 10, in in-car recorder 33, segments the sound collected by wearable camera 10 into sound sections, and transmits the segment data including a segmented sound to back end server 50 via a wireless LAN. In a case where a sound with a large volume suddenly occurs, sound section segmentation is performed so as to include the sound with a large volume. The sound section segmentation may be performed so as to sample a predetermined section at a predetermined period. In this case, in a section at which no sudden sound occurs, only a surrounding sound with a small volume is segmented.

In addition, in monitoring video analysis system 5, in a case where wearable camera 10 is directly connected to a network for use, wearable camera 10 is connected to wireless LAN access point 45 or smartphone 40 so as to perform data transmission. For connection between wearable camera 10 and smartphone 40, for example, short-range wireless communication such as Bluetooth (registered trademark) low energy (BLE), or wireless LAN communication using tethering which allows one of wearable camera 10 and smartphone 40 to function as a wireless LAN access point, is used. Wearable camera 10 transmits the video data and the sound data recorded, to back end server 50 via wireless LAN access point 45 or smartphone 40.

In addition, when police officer 3 returns to police station 4 and puts wearable camera 10 on integrated charging stand 68, integrated charging stand 68 charges wearable camera 10, and allows wearable camera 10 to transmit the monitoring video data and the sound data recorded in wearable camera 10 to back end server 50 via a USB cable.

When receiving the monitoring video data via back end streaming server 60 or directly from wearable camera 10 or in-car camera system 30, back end server 50 records and stores the received monitoring video data into a storage. In addition, when receiving the segment data from in-car camera system 30 and wearable camera 10, back end server 50 recognizes a sound included in the segment data, performs a comparison of the recognized sound with sounds registered in the sound database in which preset sound data related to patrols or incidents is registered in advance, and notifies in-car camera system 30 and wearable camera 10 of the comparison result.

Further, when police officer 3 requests, to back end server 50, processing such as search of a sound related to an incident by operating back end client 70, in accordance with the request from back end client 70, back end server 50 performs an inquiry of a sound registered in the sound database.

First Embodiment

Figure 2:
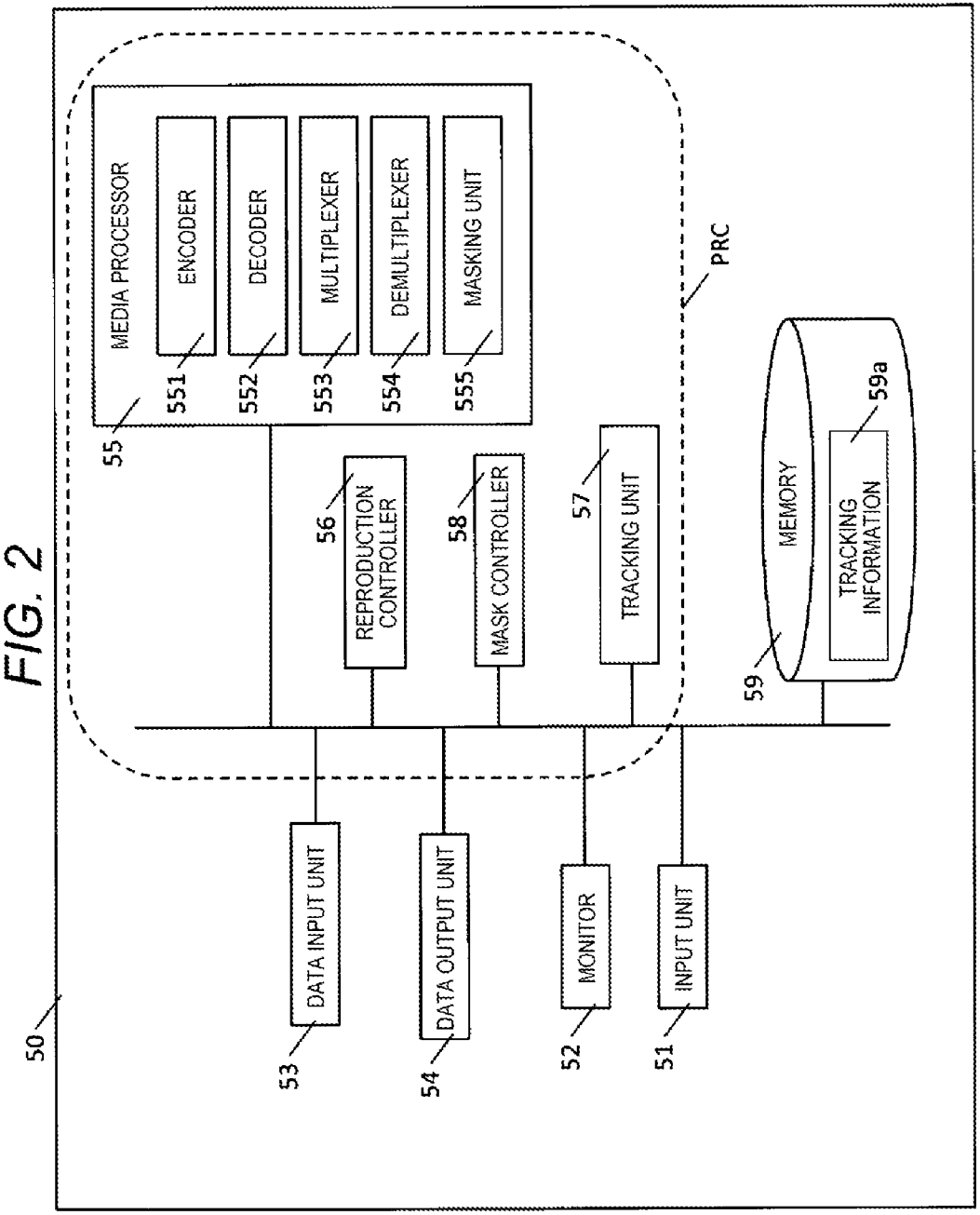
FIG. 2 is a block diagram illustrating in detail an example of an internal configuration of a back end server according to each embodiment.

FIG. 2 is a block diagram illustrating in detail an example of an internal configuration of back end server 50 according to each embodiment. Back end server 50 as an example of a server includes processor PRC, an I/O interface, a user interface (UD), and memory 59. In each embodiment, it is described that mask processing is performed on back end server 50. On the other hand, mask processing may be performed on back end client 70, for example, by exporting necessary moving images from back end server 50 to back end client 70. Thus, all of the internal configuration of FIG. 2 may be configured in back end client 70 (so-called PC). In FIG. 2, although monitor 52 is illustrated as being included inside back end server 50, monitor 52 may be provided outside back end server 50.

Processor PRC includes media processor 55, reproduction controller 56, tracking unit 57, and mask controller 58. Processor PRC is configured with, for example, a central processing unit (CPU), a micro processing unit (MPU), or a digital signal processor (DSP). Media processor 55 performs decoding processing and encoding processing, moving image format conversion processing, mask processing, and the like on data of the monitoring video (for example, the monitoring video captured by wearable camera 10 or in-car camera 31), which is imported to back end server 50, and includes encoder 551, decoder 552, multiplexer 553, demultiplexer 554, and masking unit 555.

Demultiplexer 554 receives a moving image data file which is input from data input unit 53, the moving image data file with, for example, an mpeg 4 (MP4) file format, and extracts encoded video data stored in an H.264 codec format and encoded sound data stored in an AAC codec format, from the moving image data file with an MP4 file format.

Decoder 552 decodes H.264 encoded data into non-encoding data (so-called RAW data). The decoded non-encoding data is YUV data or RGB data.

Encoder 551 encodes the non-encoding data as YUV data or RGB data into H.264 encoding data. As the non-encoding data, which is decoded by decoder 552 and is encoded by encoder 551, YCbCr data, YPbPr data, or the like may be used.

Multiplexer 553 generates an MP4 moving image data file by converting H.264 encoding video data and AAC encoding sound data into an MP4 moving image data file. The moving image data file generated by multiplexer 553 is output from data output unit 54, and is stored into a recording medium such as an SD card that can be read by back end server 50 or is transmitted to back end client 70 or the like via a communication device (not illustrated).

Masking unit 555 performs mosaic processing on an object on the corresponding frame, as an example of mask processing, based on tracking information 59a (metadata) representing a position (for example, a coordinate value) of at least one object appearing in each frame (frame image) constituting the monitoring video data. In the following description, an object refers to, for example, a person, a face of a person, or a tangible object having a shape or a pattern similar to a person or a face of a person. In each embodiment, a case where mosaic processing is performed as mask processing in a broad sense, is described. On the other hand, the mask processing is not limited to the mosaic processing, and as the mask processing, filling processing, replacement processing using an animation image or a predetermined replacement image, or image deformation processing using a spiral or a blur may be performed. In other words, the mask processing means image processing which makes it impossible to specify an object to be masked in a frame image of the monitoring video, in order to protect privacy of the object, in spite of damage of visibility of a corresponding portion in which the object to be masked appears.

Reproduction controller 56 controls a reproduction operation of the video data file. For example, as will be described later, in a case where tracking start button IC1 is pressed, reproduction controller 56 acquires information indicating a press of tracking start button IC1, from monitor 52 (for example, a display with a touch panel), and plays (reproduces) each frame constituting the monitoring video data to be reproduced so as to synchronize with an operation of tracking unit 57. The information indicating a press of tracking start button IC1 is notified from monitor 52 (for example, a display with a touch panel) to reproduction controller 56 and tracking unit 57.

Mask controller 58 controls an on/off operation as to whether or not to perform the mask processing on an object automatically extracted by tracking unit 57, according to an instruction of a user (for example, police officer 3 who operates back end server 50). Mask controller 58 may determine that the mask processing is performed on the object automatically extracted by tracking unit 57 as a default, even when there is no instruction by the user's operation.

When frames of the monitoring video (moving image) data file are played in order by reproduction controller 56, in synchronization with the orderly playing, tracking unit 57 searches an object appearing in each frame which is read into memory 59, detects a position of the object in a corresponding frame, and adds the position of the object to tracking information 59a (metadata). At this time, tracking unit 57 registers position information (for example, coordinate information) of the object and a serial number of the object (object ID), in correlation with the frame image or identification information of the frame image, into memory 59, as tracking information 59a. In other words, as described above, the tracking is an operation of, in synchronization with the orderly playing of the frames of the monitoring video (moving image) data file, detecting whether or not an object appears in each frame and whether the object is the same, and acquiring the position information of the object in each frame and the serial number of the object (for example, object ID) in a case where the object appears in each frame and the object is the same.

The I/O interface includes data input unit 53 and data output unit 54. Data input unit 53 receives (imports) a video data file of a video captured by wearable camera 10 or in-car camera 31. In the present embodiment, as described above, an MP4 video data file is used.

Data output unit 54 stores the MP4 video data file into a recording medium such as an SD card, and transmits the MP4 video data file to back end client 70 and the like via a communication device.

The user interface (UI) displays information for a user, receives an input operation by the user, and includes monitor 52 and input unit 51. The UI may be configured with, for example, a display with a touch panel in which monitor 52 and input unit 51 are combined with each other and are accommodated in one housing. Monitor 52 and input unit 51 may be accommodated in separate housings, respectively. As the monitor, a liquid crystal display (LCD), an organic EL, a plasma display, an LED, or the like is used. As input unit 51, a touch pad, a mouse, a keyboard, and the like are used.

Memory 59 stores the video data file with a large amount, and holds tracking information 59a and the like. In tracking information 59a, the position of the object to be subjected to the mosaic processing and the serial number of the object (for example, object ID) are registered for each frame of the video data file.

Figure 3:
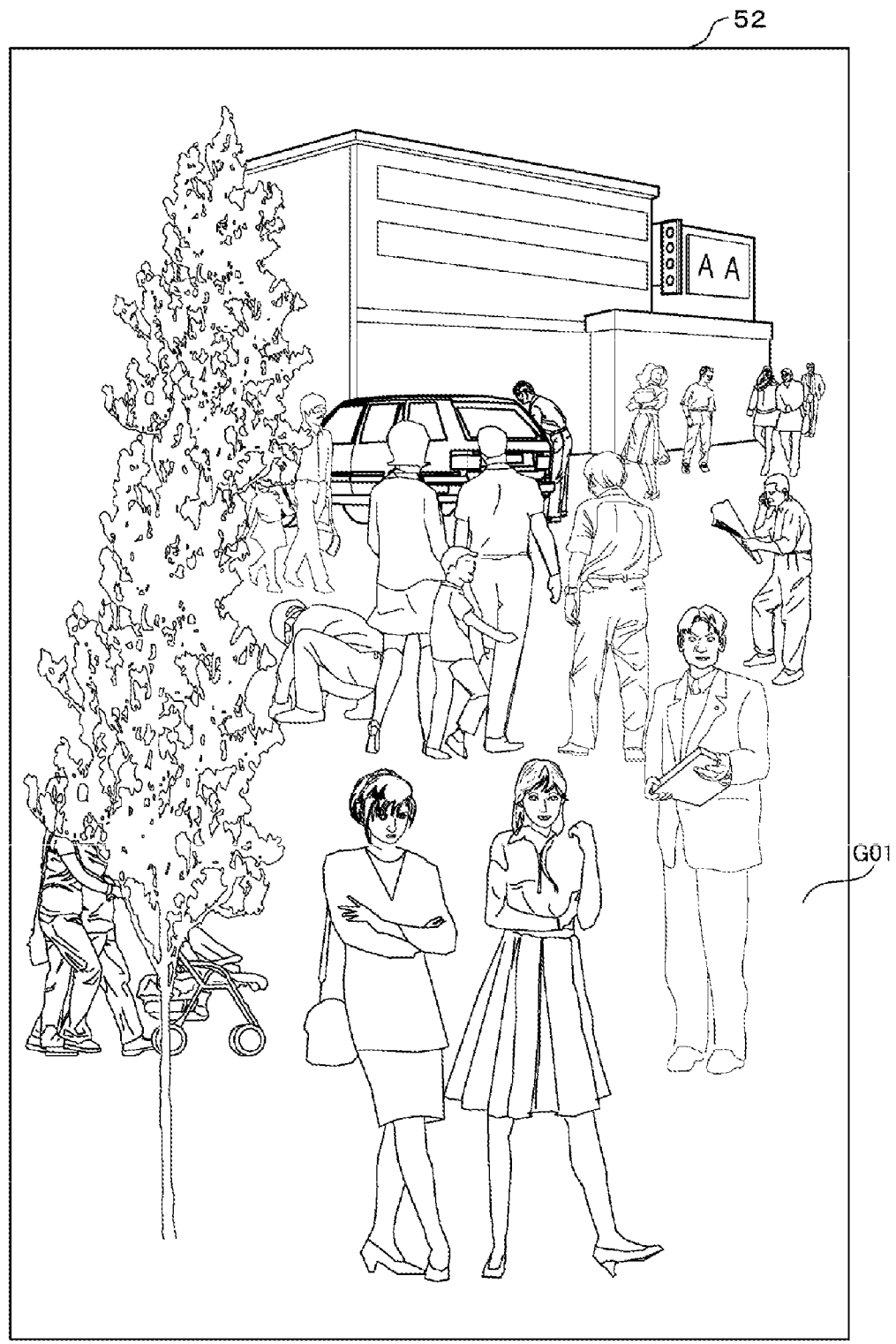
FIG. 3 is a diagram illustrating an example of a frame constituting a monitoring video of a wearable camera that is imported by a back end server according to a first embodiment.

FIG. 3 is a diagram illustrating an example of frame G01 constituting a monitoring video of wearable camera 10 that is imported by back end server 50 according to the first embodiment. The plurality of video data files constituting the monitoring video of a scene captured by wearable camera 10 are collectively input to data input unit 53 at the time of importing. Frame G001 of the monitoring video illustrated in FIG. 3 is, for example, a first frame of a monitoring video captured in the same capturing area (for example, an incident site, an accident site, or a place under patrol, and hereinafter, the same as above). In frame G001 of the monitoring video, many persons walking on a street appear. Frame G01 is a frame before automatic extraction of an object is performed by the face recognition function of tracking unit 57 of back end server 50. Thus, in frame G01, a border surrounding a person's face as an object is not rendered.

Figure 4:
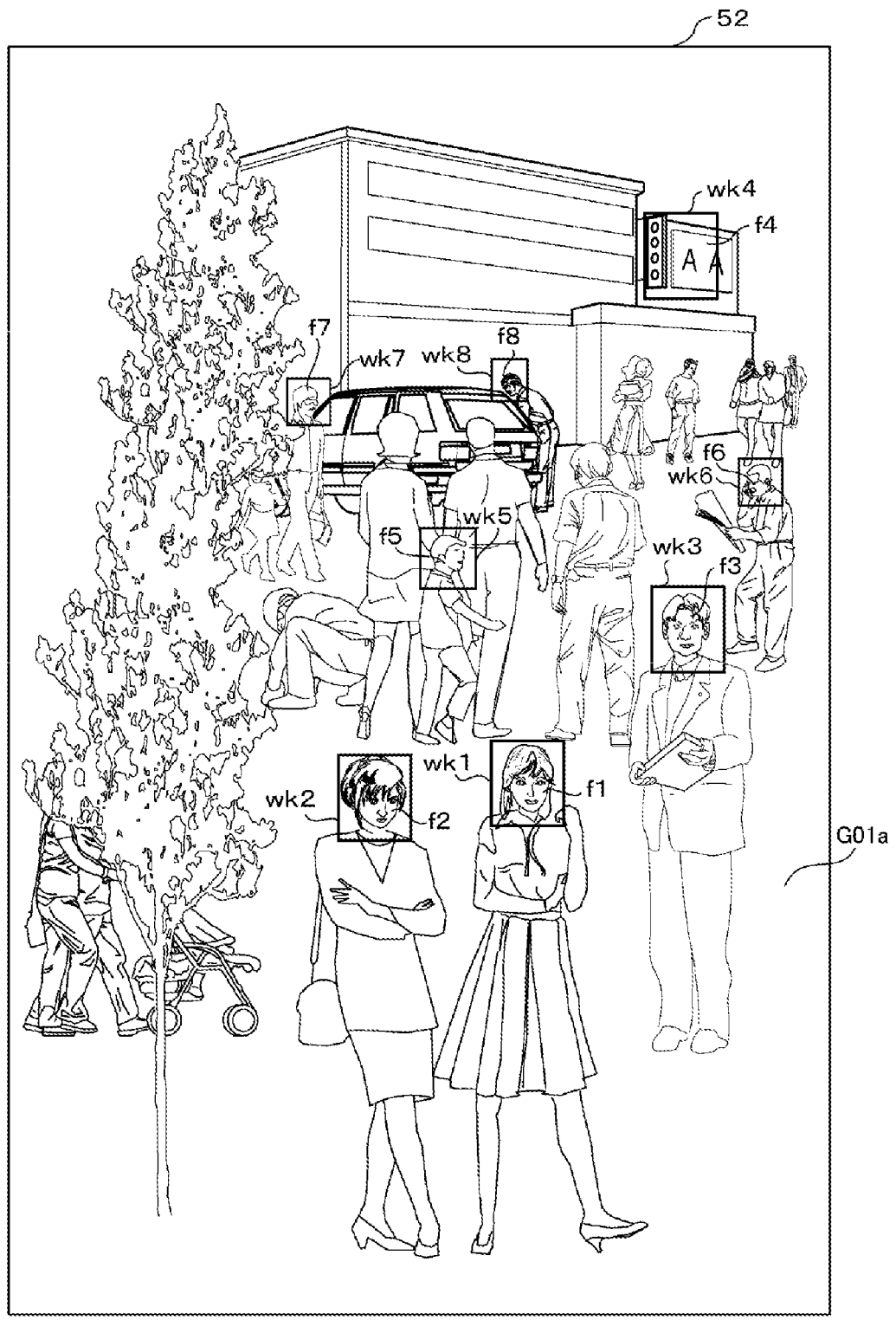
FIG. 4 is a diagram illustrating an example of a frame after an object is automatically extracted in the frame of FIG. 3 by the back end server according to the present embodiment.

FIG. 4 is a diagram illustrating an example of frame G01a after an object is automatically extracted in frame G01 of FIG. 3 by back end server 50 according to the present embodiment. Here, eight faces f1 to f8 as objects are recognized by the face recognition function of tracking unit 57 of back end server 50. Here, face f4 is a target (object) recognized as a person's face by a mistake. In frame G01a, eight solid-line borders wk1 to wk8 are rendered by tracking unit 57 so as to surround each of the recognized eight faces f1 to f8. Frame G01a after the automatic extraction may be displayed after the mask processing is specifically performed on the face within the border by masking unit 555, or may be displayed after only the mask processing is performed without the border. Accordingly, a user can specifically recognize an image when the mask processing is actually performed. At this time, masking unit. 555 may perform the mask processing on only the face, or may perform the mask processing on the entire border, for example, based on setting information of mask controller 58. The setting information indicating whether the mask processing is performed on only the face or whether the mask processing is performed on the entire border, is held in advance in mask controller 58. On the other hand, it goes without saying that the setting information may be appropriately changed and set by a user's operation.

Hereinafter, an image analysis operation of monitoring video analysis system 5 with the above-described configuration will be described.

Figure 5:
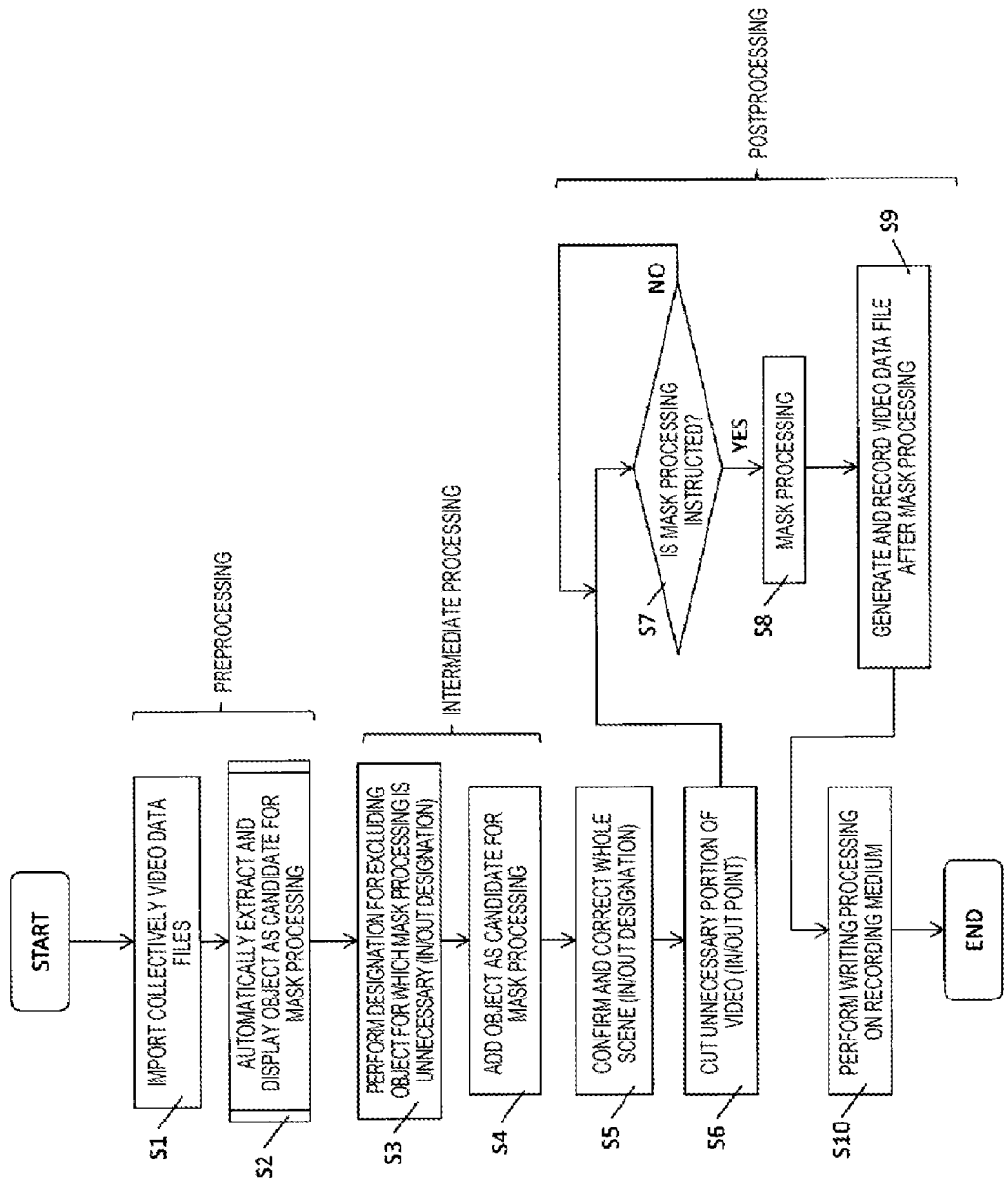
FIG. 5 is a flowchart explaining in detail an example of each operation procedure of preprocessing, intermediate processing, and postprocessing of the back end server according to the first embodiment.

FIG. 5 is a flowchart explaining in detail one example of each operation procedure of preprocessing, intermediate processing, and postprocessing of back end server according to the present embodiment. In FIG. 5, the preprocessing refers to processing of steps S1 to S2, the intermediate processing refers to processing of steps S3 to S4, and the postprocessing refers to processing of steps S5 to S10.

In FIG. 5, data input unit 53 collectively receives (imports) video data files from wearable camera 10 (S1). Demultiplexer 554 demultiplexes the MP4 moving image data file which is input from data input unit 53 into H.264 encoded data. Decoder 552 decodes H.264 encoding data into non-encoding data as YUV data or RGB data, reads the non-encoding data as video data into a working memory (not illustrated), and temporarily develops the non-encoding data in the working memory.

In synchronization with the reproduction by reproduction controller 56 (that is, in synchronization with the orderly playing of the plurality of frames constituting the moving image data file), tracking unit 57 automatically extracts an object to be masked in each frame of the video data as non-encoding data, and displays the extracted object on monitor 52 (S2). In step S2, the object to be masked is automatically extracted in each frame of the moving image data, and tracking information 59*a* in which the serial number of the automatically extracted object (for example, object ID) and the position information (for example, coordinate information) in each frame are correlated with each other, is generated. The processing of step S2 will be described later.

Mask controller 58 receives an operation of a user (for example, a police officer who is a user of back end server 50) that is input via input unit 51 (for example, a mouse, a keyboard, or the like), and performs designation for excluding an object for which the mask processing is unnecessary (S3). Specifically, in an initial setting, for all of the plurality of objects which are automatically extracted in step S2, the mask processing is set as "on" (that is, all of the plurality of objects are set to be masked). Thus, in step S3, individual on/off setting of the mask processing is performed based on a user's operation. "off" refers to an object designated by a user's operation as an object for which the mask processing is unnecessary, and similarly, "on" refers to an object designated by a user's operation as an object for which the mask processing is necessary. At this time, at least one object, which is designated so as to be excluded from the mask processing by off designation, is excluded from the mask processing performed in step S8 to be described later. In other words, in a case where the object is a face of a person, the face of the person is not subjected to the mosaic processing, and is revealed. In addition, there is no need to perform the on/off designation for all of the objects appearing in all of the frames, and the on/off designation may be collectively performed for the same object by using the serial number of the object (for example, object ID). In each frame of the moving image data, a border surrounding the object (for example, the face of the person) for which the mask processing is unnecessary in step S3, is switched, for example, from a solid-line border to a dotted-line border, and the border is displayed by being distinguished from other borders (refer to FIG. 7). Accordingly, a user can visually distinguish and recognize an object for which the mask processing is unnecessary and an object for which the mask processing is necessary.

Mask controller 58 receives an operation of a user (a police officer who is a user of back end server 50) that is input, for example, via input unit 51, and adds an object as a candidate for the mask processing (S4). Processing of step S4 will be described in detail later. In each frame of the moving image data, a border surrounding the object (a face of a person) added as a candidate for the mask processing, may be displayed by a border with a different display mode from the solid-line border of the automatically extracted object. In this case, a user can visually and clearly distinguish and recognize an object to be masked that is added as a candidate for the mask processing and an object for which the mask processing is unnecessary.

According to an operation of a user (a police officer who is a user of back end server 50), mask controller 58 confirms an object for which the mask processing is unnecessary or an object added as a candidate for the mask processing in the frames of the moving image data of all the scenes, and corrects the on/off designation such that an excess or a deficiency in the objects to be masked does not occur (S5).

Media processor 55 collectively deletes frames designated as unnecessary frames by a user's operation (S6). For example, in a case where there is moving image data for each 10 seconds, a frame at two seconds is set as "in" (necessary) by a user's operation, and a frame at nine seconds is set as "out" (unnecessary) by a user's operation. In this case, media processor 55 deletes unnecessary frames from moving images, and eventually encodes moving image data with frames from two seconds to eight seconds. At this time, the metadata as the position information of each object in the deleted frame is also deleted. Accordingly, media processor 55 updates tracking information 59*a* generated in step S2 by tracking unit 57, as necessary.

The masking unit 555 determines whether or not the mask processing for the moving image data file is instructed based on the presence or absence of the on/off designation by a user's operation (S7). In a case where the mask processing is not instructed (NO in S7), masking unit 555 waits for processing until the mask processing is instructed. In a case where the mask processing is not instructed in step S7, the process of back end server 50 may return to step S1.

On the other hand, in a case where the mask processing for the moving image data file is instructed (YES in S7), based on tracking information 59*a*, masking unit 555 performs the mask processing such as mosaic processing on an object indicated by the metadata (position information) for each frame that is prescribed in tracking information 59*a* (S8). Accordingly, it is possible to prevent ordinary citizens and the like from appearing in the captured video.

Encoder 551 encodes video data (non-encoding data as YUV data or RGB data) which is subjected to the mask processing such as mosaic processing, into H.264 encoding data. In addition, multiplexer 553 generates an MP4 moving image data file based on the H.264 encoding data, and stores the MP4 moving image data file into memory 59 (S9).

Data output unit 54 performs processing of writing the moving image data file generated by multiplexer 553 on a recording medium such as an SD card (S10). Thereafter, back end server 50 ends the operation.

Figure 6:
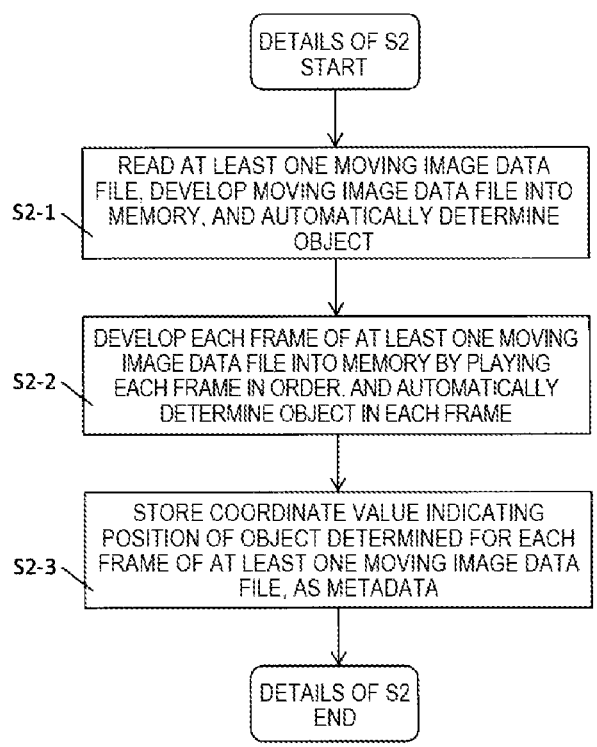
FIG. 6 is a flowchart explaining in detail an operation procedure of step S2 of preprocessing in the back end server according to the first embodiment.

FIG. 6 is a flowchart explaining in detail an operation procedure of step S2 of preprocessing in back end server 50 according to the first embodiment. Tracking unit 57 reads at least one moving image data file, develops the moving image data file into memory 59, and automatically determines (automatically extracts) an object (S2-1).

In synchronization with the orderly playing of the frames by reproduction controller 56, tracking unit 57 develops each frame constituting at least one moving image data file into memory 59, and automatically determines an object in each frame (S2-2). Tracking unit 57 stores a coordinate value indicating the position of the object determined for each frame of at least one moving image data file, together with the serial number of the object (for example, object ID), into memory 59, as tracking information 59a (metadata) (S2-3). Tracking information 59a may be added as a part of a header portion of the video data, or may be stored as a separate file by being linked to the moving image data file. Thereafter, back end server 50 returns to processing of step S3.

Figure 7:
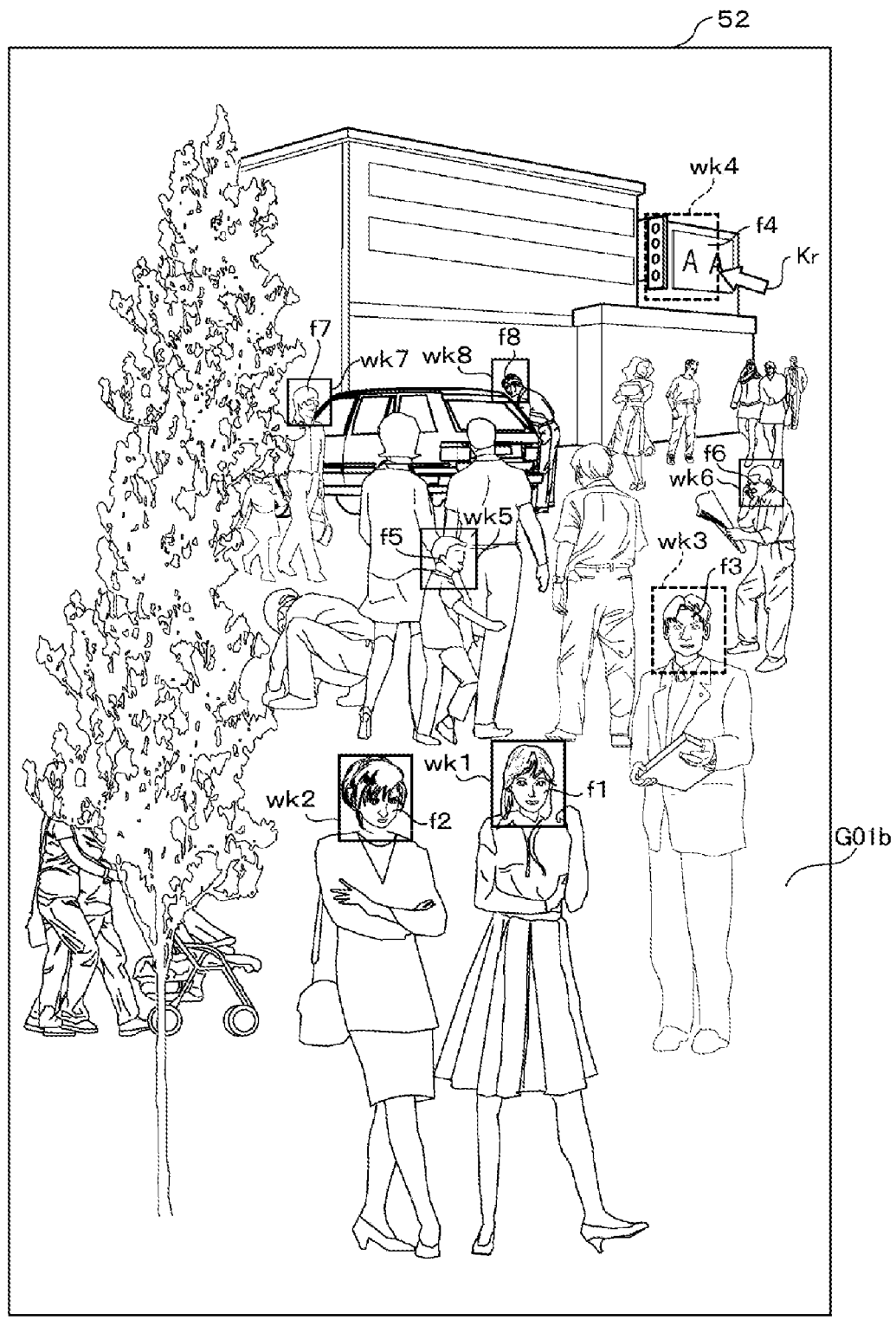
FIG. 7 is a diagram illustrating an example of a frame after a plurality of objects in the frame of FIG. 4 are designated to be excluded from mask processing by the back end server according to the present embodiment based on a user's operation.

FIG. 7 is a diagram illustrating an example of frame G01b after a plurality of objects in frame G01a of FIG. 4 are designated to be excluded from the mask processing by back end server 50 according to the present embodiment based on a user's operation. When police officer 3 as a user of back end server 50 selects an object using cursor Kr displayed on monitor 52 by operating input unit 51 (a mouse or the like), designation of the selected object is canceled. In frame G01b, face f4 is automatically extracted by a mistake, and thus designation of the object is canceled. In this case, solid-line border wk4 is switched to a dotted-line border. In addition, face f3 is determined as an object for which the mask processing is unnecessary (for example, a face of a public person (for example, a mayor) who does not need privacy protection, a suspect related to an incident, or the like) by a subjective opinion of police officer 3, and designation of the object is canceled. Even in this case, solid-line border wk3 is switched to a dotted-line border. In this case, face f3 is not subjected to mosaic processing.

As described above, monitoring video analysis system 5 according to the first embodiment includes wearable camera 10 (camera) which is used by a user, and back end server 50 (server) for receiving video data files of a video captured by wearable camera 10. Back end server 50 detects at least one object appearing in each frame (frame image) constituting the received video data file, for each frame. Back end server 50 stores the position of at least one object detected for each frame (for each frame image) and the serial number of the object (for example, object ID), into memory 59, as tracking information 59a (metadata), for each object. Back end server 50 displays at least one object detected for each frame, on monitor 52, by using identifiable solid-line border wk1 (first display mode).

In this way, the object displayed on monitor 52 can be identified by the solid-line border. Therefore, back end server 50 can easily recognize the object to be masked that is designated by a user, and instruct the mask processing on the object. Accordingly, it is possible to support reduction of a workload of the mask processing while observing privacy protection of an object by flexibly masking the object appearing in a video.

In addition, according to designation of any object displayed on monitor 52, back end server 50 displays the designated object by using identifiable dotted-line border wk4 (second display mode).

In this way, since the designated object is displayed with the dotted-line border, back end server 50 can distinguish the object designated by a user's operation as an object for which the mask processing is unnecessary, such as an object which is recognized by a mistake, an object which does not need privacy protection, from an object for which the mask processing is necessary. Therefore, a user can easily instruct the mask processing only for the object for which the mask processing is necessary. Further, in the mask processing, there is no need to conceal information for the object for which the mask processing is unnecessary, and thus it, is possible to prevent an increase in workload of the mask processing.

In addition, back end server 50 masks an object displayed by the solid-line border such that the object cannot be determined, by using the position information of at least one object for each frame that is displayed by the solid-line border.

As described above, back end server 50 masks the object by using the position information of the object, the position information being stored when displaying the object by the identifiable solid-line border. Thus, when performing the mask processing, back end server 50 may not newly determine the position of the object. Therefore, back end server 50 can increase a processing speed of the mask processing and reduce a load of the mask processing.

In addition, back end server 50 does not perform the mask processing which makes the object displayed by dotted-line border wk4 unrecognizable.

In this way, back end server 50 can distinguish, for example, the object designated by a user's operation as an object for which the mask processing is unnecessary, from an object for which the mask processing is necessary. Further, in the mask processing, there is no need to conceal information for the object for which the mask processing is unnecessary, and thus back end server 50 can prevent an increase in load of the mask processing.

Background to Content of Second Embodiment

Here, in a monitoring video captured by an image capturing device such as a security camera in town or a wearable camera held by a police officer or the like, many people such as ordinary citizens who are not directly related to an incident such as a case or an accident, appear in some cases. In order to protect privacy, it is necessary to perform image processing such as mask processing on a face of each person such that it is difficult to specify who the person is.

However, when performing the image processing such as the above-described mask processing, even though a configuration described in Japanese Patent Unexamined Publication No. 2016-158156 is used, which portion of the video a mask disable area is set preferably and which movement pattern each person moves with vary depending on each monitoring video. Thus, it is difficult to uniformly set the mask disable area and uniformly determine the movement pattern. For this reason, for a plurality of persons such as ordinary citizens who appear in the monitoring video, it is difficult to flexibly set addition and deletion of the plurality of persons as an object to be masked.

Therefore, in a second embodiment, for each person appearing in a monitoring video captured by an image capturing apparatus such as wearable camera 10 or in-car camera 31, an example of a monitoring video analysis system that flexibly sets addition and deletion of each person as an object to be masked and supports privacy protection of each person in the monitoring video, will be described.

Second Embodiment

An internal configuration of back end server 50 of monitoring video analysis system 5 according to the second embodiment is the same as the internal configuration of back end server 50 of monitoring video analysis system 5 according to the first embodiment, and an explanation will be described with reference to the same reference numerals.

Figure 8:
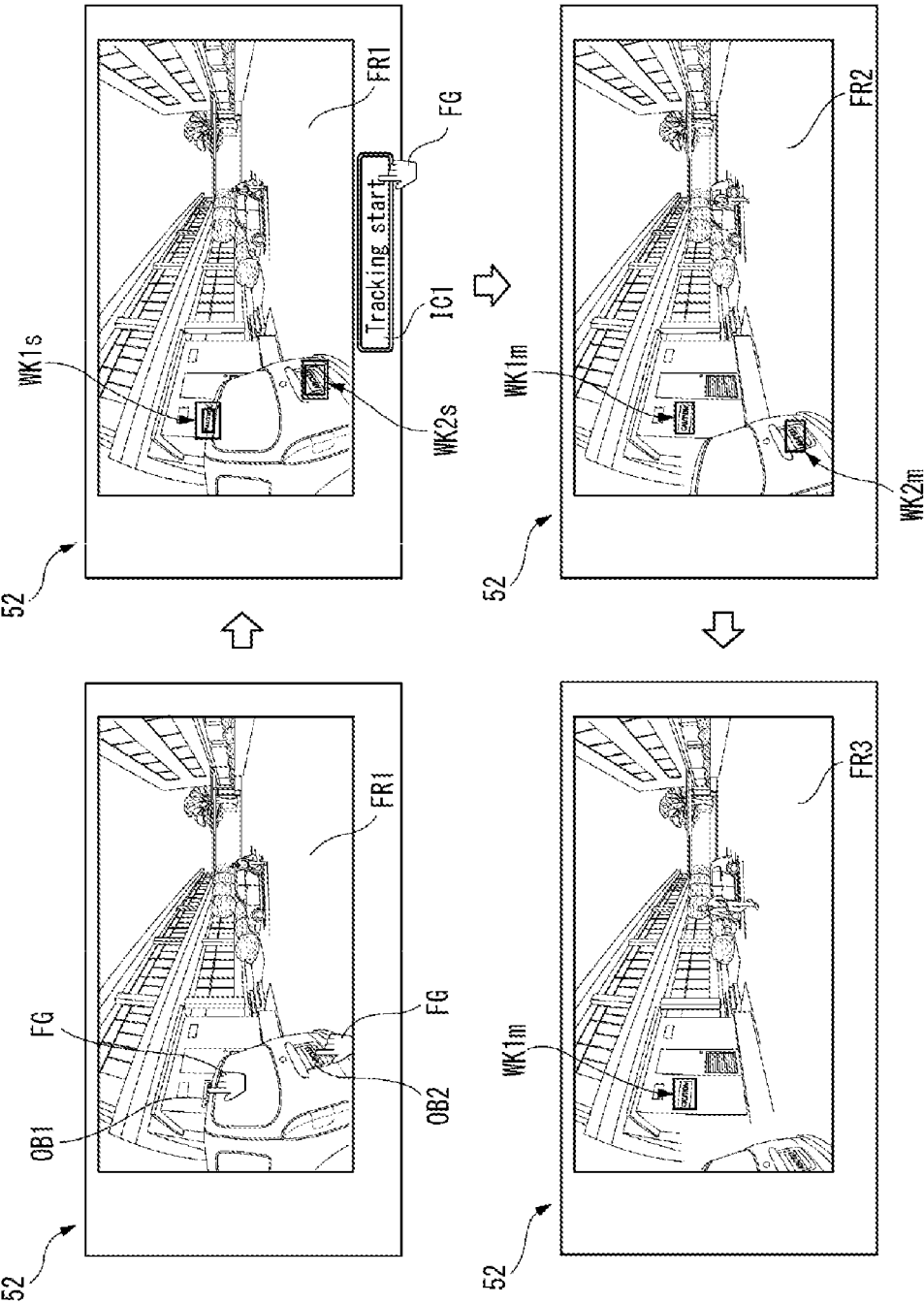
FIG. 8 is a diagram illustrating a display transition example of a frame image when an object to be masked is added by the back end server according to a second embodiment.

FIG. 8 is a diagram illustrating a display transition example of a frame image when an object to be masked is added by back end server 50 according to the second embodiment. For example, it is assumed that a reproduction operation is performed on data of a monitoring video, which is captured by wearable camera 10, by an operation of a user of back end server 50. The data of the monitoring video is imported to back end server 50 via data input unit 53, and is converted, for example, from MP4 format data into H.264 format encoded data by demultiplexer 554. The H.264 format encoded data is converted into non-encoding data such as YUV format data or RGB format data by decoder 552. The non-encoding data is read into a RAM (not illustrated) such as a work memory, and is reproduced by reproduction controller 56. Thus, the non-encoding data is displayed on monitor 52. The monitoring video data which is reproduced by an operation of a user of back end server 50 may be data of a monitoring video in which one or more objects are set as an object to be masked in the first embodiment.

It is assumed that a pause operation is performed by an operation of a user of back end server 50 after the reproduction is started. Thereafter, by an operation of a user of back end server 50, a plurality of objects OB1 and OB2, which are added by the user as an object to be masked, are selected on first frame image FR1 (first frame image) among the plurality of frame images constituting the monitoring video data. Object OB1 is a signboard, and object OB2 is a number plate of a vehicle. By the selection, mask controller 58 sets objects OB1 and OB2 as an object to be masked. In FIG. 8 and subsequent drawings, although selection by user's finger FG is illustrated as an example of a user's operation, it goes without saying that selection by a mouse, a keyboard or the like may be made.

Tracking unit 57 displays a plurality of objects OB1 and OB2 on monitor 52 by superimposing double-line borders WK1s and WK2s as an example of a display mode in which objects OB1 and OB2 can be identified, on a portion around each of objects OB1 and OB2 in frame image FR1. In addition, in accordance with selection of objects OB1 and OB2 which are added as an object to be masked, tracking unit 57 displays tracking start button IC1 on the lower side of frame image FR1, as a part of a user interface (UI) screen. Tracking start button IC1 may be displayed only when reproduction of the monitoring video is paused.

When tracking start button IC1 is pressed by an operation of a user of back end server 50 (for example, selection by finger FG of the user), tracking unit 57 instructs reproduction controller 56 to restart reproduction of the paused monitoring video (in other words, to display the monitoring video by playing subsequent frame images in order from frame image FR1). Accordingly, reproduction controller 56 can restart reproduction of the monitoring video. In addition, in accordance with reproduction of the monitoring video by reproduction controller 56, tracking unit 57 autonmatically detects, in frame image FR2 subsequent to frame image FR1, the plurality of objects OB1 and OB2 selected in frame image FR1, and displays objects OB1 and OB2 on monitor 52 by superimposing single-line borders WK1m and WK2m as an example of a display mode in which objects OB1 and OB2 can be identified, on a portion around each of objects OB1 and OB2 in frame image FR2.

In frame image FR3 in which the monitoring video is continually reproduced by reproduction controller 56, and for example, object OB2 no longer appears in frame images (in other words, object OB2 is not automatically detected), tracking unit 57 does not display single-line border WK2m of object OB2. On the other hand, since object OB1 appears in frame image FR3 (in other words, object OB1 is automatically detected), tracking unit 57 continues to display single-line border WK1m of object OB1.

In accordance with reproduction of the monitoring video by reproduction controller 56, masking unit 555 of media processor 55 may perform the mask processing on objects OB1 and OB2, which is selected as an object to be masked, in each of frame images FR1, FR2, FR3, . . . , and display the mask processing result on monitor 52. Accordingly, a user of back end server 50 can specifically recognize a situation where the object selected by the user himself/herself is masked during reproduction of the monitoring video, and appropriately determine whether or not to include the object as an object to be masked.

In addition, double-line borders WK1s and WK2s are displayed on objects OB1 and OB2 selected in first frame image FR1 among the plurality of frame images constituting the monitoring video, and single-line borders WK1m and WK2m are displayed on objects OB1 and OB2 selected in frame images FR2, FR3, . . . , which is not first frame image. This is because, when deleting an object added as an object to be masked, in a case where a deletion operation is performed on object on which double-line borders WK1s and WK2s are displayed, all the frame images can be deleted, and in a case where a deletion operation is performed on object on which single-line borders WK1m and WK2m are displayed, deletion of only the corresponding frame image can be enabled, thereby distinguishing the number of frame images to be deleted. The same applies to the following.

Figure 9:
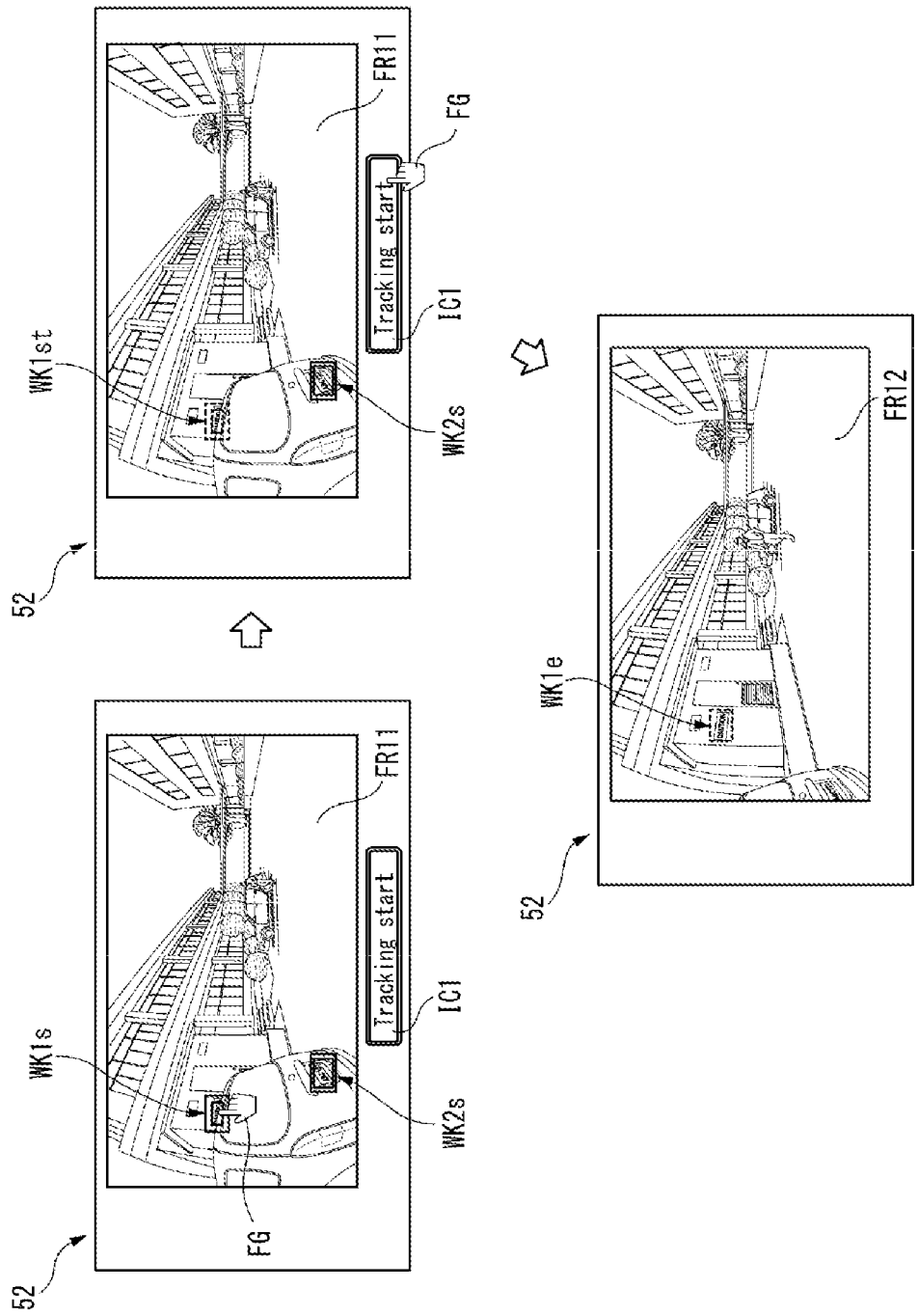
FIG. 9 is a diagram illustrating a display transition example of a frame image when an object to be masked is temporarily deleted by the back end server according to the second embodiment.

FIG. 9 is a diagram illustrating a display transition example of a frame image when an object to be masked is temporarily deleted by back end server 50 according to the second embodiment. For example, it is assumed that a reproduction operation by an operation of a user of back end server 50 is performed on the monitoring video data in which one or more objects are set as an object to be masked in the first embodiment or the monitoring video data in which one or more objects are set as an object to be masked in a method of FIG. 8. As described with reference to FIG. 8, the monitoring video data is converted into non-encoding data such as YUV format data or RGB format data. The non-encoding data is read into a RAM (not illustrated) such as a work memory, and is reproduced by reproduction controller 56. Thus, the non-encoding data is displayed on monitor 52.

It is assumed that a pause operation is performed by an operation of a user of back end server 50 after the reproduction is started. Thereafter, by an operation of a user of back end server 50 (for example, a selection operation by finger FG of a user), object OB1, which is already set as an object to be masked in first frame image FR11 (second frame image) among the plurality of frame images constituting the monitoring video data, is selected as an object that the user wants to temporarily delete from objects to be masked. By the selection, mask controller 58 sets object OB1 as an object to be temporarily deleted from objects to be masked. Hereinafter, "temporary" means a time width (period) from a frame image when an object is selected by a user's operation (for example, the first frame image among a plurality of frame images constituting the monitoring video)

to a frame image in which the object does not appear, in accordance with the reproduction of the monitoring video.

Tracking unit 57 replaces double-line border WK1s superimposed and displayed around object OB1 with double dotted-line border WK1st as an example of a display mode in which object OB1 to be temporarily deleted from objects to be masked can be identified, and displays double dotted-line border WK1st on monitor 52. On the other hand, tracking unit 57 continues to perform superimposition display by superimposing double-line border WK2k as an example of a display mode in which object OB2 already set as an object to be masked can be identified, on a portion around object OB2. In addition, in accordance with selection of object OB1 to be temporarily deleted from objects to be masked, tracking unit 57 displays tracking start button IC1 on the lower side of frame image FR11, as a part of a user interface (UI) screen.

When tracking start button IC1 is pressed by an operation of a user of back end server 50 (for example, selection by finger FG of the user), tracking unit 57 instructs reproduction controller 56 to restart reproduction of the paused monitoring video (in other words, to display the monitoring video by playing subsequent frame images in order from frame image FR11). Accordingly, reproduction controller 56 can restart reproduction of the monitoring video. In addition, in accordance with reproduction of the monitoring video by reproduction controller 56, tracking unit 57 automatically detects, in frame image FR12 subsequent to frame image FR11, object OB1 selected as an object to be temporarily deleted from objects to be masked in frame image FR11, and displays object OB1 on monitor 52 by superimposing single dotted-line border WK1et as an example of a display mode in which object OB1 can be identified, on a portion around object OB1 in frame image FR12.

In frame image (not illustrated) in which the monitoring video is continually reproduced by reproduction controller 56, and for example, object OB1 no longer appears in frame images (in other words, object OB1 is not automatically detected), tracking unit 57 does not display single-line border WK1e of object OB1. That is, object OB1 is temporarily deleted from objects to be masked until object OB1 selected by a user's operation does not appear in the frame images.

In accordance with reproduction of the monitoring video by reproduction controller 56, masking unit 555 of media processor 55 may perform, in each of frame images FR11, FR12, . . . , the mask processing on object OB2 already set as an object to be masked and display the mask processing result on monitor 52, instead of performing, in each of frame images FR11, FR12, . . . , the mask processing on object OB1 to be temporarily deleted from objects to be masked. Accordingly, during reproduction of the monitoring video, a user of back end server 50 can specifically recognize both of a situation where the object selected by the user himself/herself is masked and a situation where the object selected by the user himself/herself is not masked, and appropriately determine whether or not to include the object as an object to be masked or whether or not to delete the object from objects to be masked. In a case where an object displayed around the single-line border is selected in a frame image (for example, frame image FR12) other than first frame image FR11, only the frame is set as a frame to be temporarily deleted in the mask processing.

Figure 10:
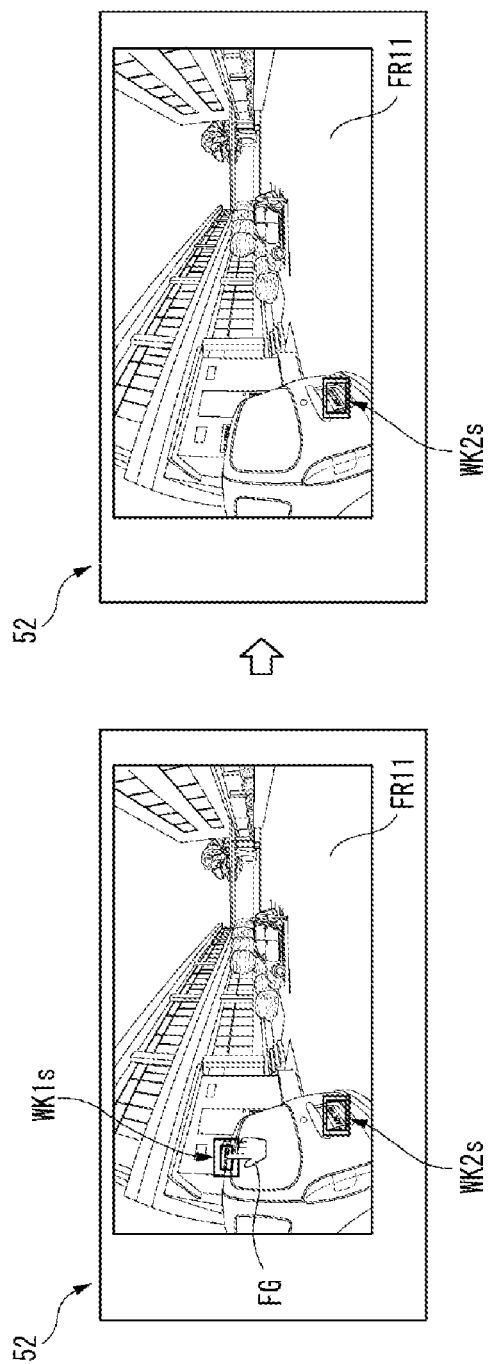
FIG. 10 is a diagram illustrating a display transition example of a frame image when an object to be masked is completely deleted by the back end server according to the second embodiment.

FIG. 10 is a diagram illustrating a display transition example of a frame image when an object to be masked is completely deleted by back end server 50 according to the second embodiment. For example, it is assumed that a reproduction operation by an operation of a user of back end server 50 is performed on the monitoring video data in which one or more objects are set as an object to be masked in the first embodiment or the monitoring video data in which one or more objects are set as an object to be masked in a method of FIG. 8. As described with reference to FIG. 8, the monitoring video data is converted into non-encoding data such as YUV format data or RGB format data. The non-encoding data is read into a RAM such as a work memory, and is reproduced by reproduction controller 56. Thus, the non-encoding data is displayed on monitor 52.

It is assumed that a pause operation is performed by an operation of a user of back end server 50 after the reproduction is started. Thereafter, by an operation of a user of back end server 50 (for example, a selection operation by finger FG of a user), object OB1, which is already set as an object to be masked in first frame image FR11 (third frame image) among the plurality of frame images constituting the monitoring video data, is selected as an object that the user wants to completely delete from objects to be masked. Complete deletion of an object means that the object is deleted from objects to be masked in all the frame images. By the selection, mask controller 58 sets object OB1 as an object to be completely deleted from objects to be masked. At this time, the serial number of object OB1 (for example, object ID) and the position information (for example, coordinate information) in the frame are deleted from tracking information 59a.

Tracking unit 57 does not display double-line border WK1s, which is superimposed and displayed around object OB1, as an example of a display mode in which object OB1 to be completely deleted from objects to be masked can be identified, on monitor 52 (that is, deletes display of double-line border WK1s). Since the position information is deleted from the tracking information, double-line border WK1s cannot be displayed naturally. On the other hand, tracking unit 57 continues to perform superimposition display by superimposing double-line border WK2s as an example of a display mode in which object OB2 already set as an object to be masked can be identified, on a portion around object OB2.

Figure 11:
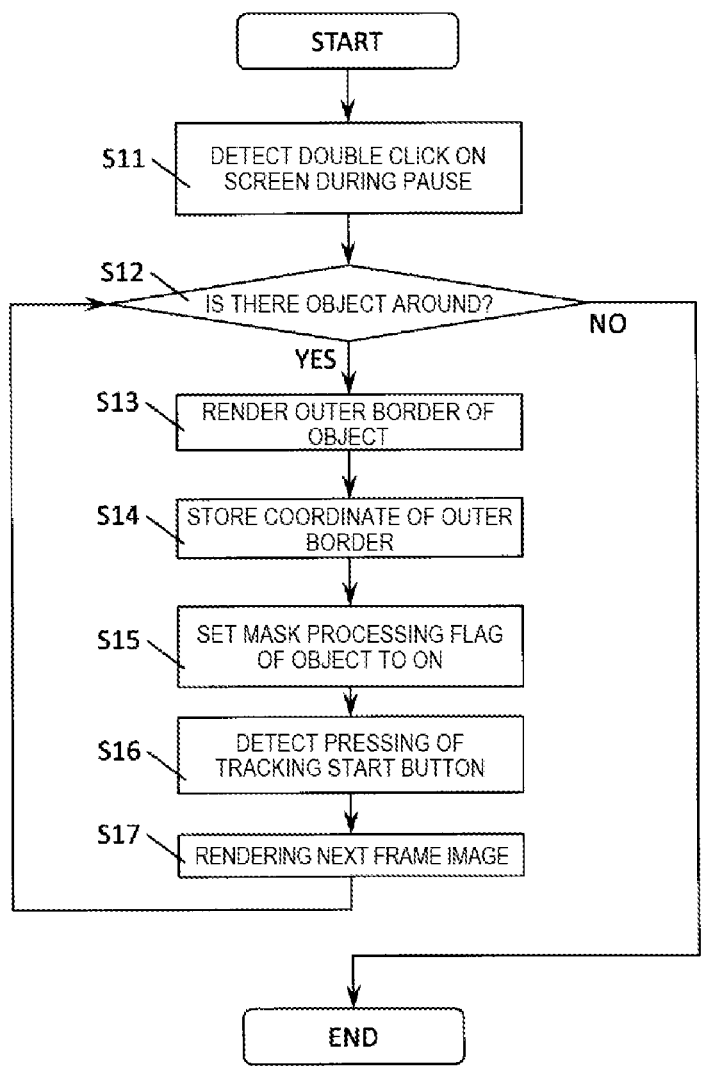
FIG. 11 is a flowchart explaining in detail an example of an operation procedure of the back end server when adding objects corresponding to FIG. 8.

FIG. 11 is a flowchart explaining in detail one example of an operation procedure of back end server 50 when adding objects OB1 and OB2 corresponding to FIG. 8. For example, it is assumed that a reproduction operation is performed on data of a monitoring video, which is captured by wearable camera 10, by an operation of a user of back end server 50.

In FIG. 11, it is assumed that a pause operation is performed by an operation of a user of back end server 50 after the reproduction is started. It is assumed that tracking unit 57 detects a double click by a user's operation on a screen on which the first frame image (for example, frame image FR1) among the plurality of frame images constituting the monitoring video is displayed during the pause (S11). By the double click, a user selects an object to be added as an object to be masked. Instead of double-clicking, a double tap by finger FG illustrated in FIG. 8 may be made.

In a case where there is no object around a detection position of the double click (that is, tracking unit 57 does not automatically detect an object) (NO in S12), processing of FIG. 11 ends. On the other hand, in a case where there is an object around a detection position of the double click (that is, tracking unit 57 automatically detects an object) (YES in S12), tracking unit 57 displays (renders) an outer border (for example, double-line border WK1s) around the object, as an example of a display mode in which the object around a detection position of the double click can be identified (S13).

Tracking unit 57 stores a coordinate indicating a position of the border in a frame image into memory 59, as tracking information 59*a* correlated with identification information of the frame image (S14). In addition, tracking unit 57 updates tracking information 59*a* by setting a mask processing flag for the object to ON (S15). The process of step S15 may be performed by mask controller 58.

Here, as described with reference to FIG. 8, it is assumed that tracking start button IC1 is pressed by an operation of a user of back end server 50. It is assumed that tracking unit 57 detects pressing of tracking start button IC1 by a user's operation (S16). Tracking unit 57 instructs reproduction controller 56 to restart reproduction of the paused monitoring video (in other words, to display the monitoring video by playing subsequent frame images in order from frame image). Accordingly, reproduction controller 56 can restart reproduction of the monitoring video (that is, display (rendering) of the next frame image on monitor 52) (S17). After step S17, the process of back end server 50 returns to step S12. The processes of step S13 to step S17 are repeatedly performed until an object around a position double-clicked in step S11 does not appear in the subsequent frame images rendered in step S17 (that is, tracking unit 57 does not automatically detect an object around the position double-clicked in step S11).

Figure 12A:
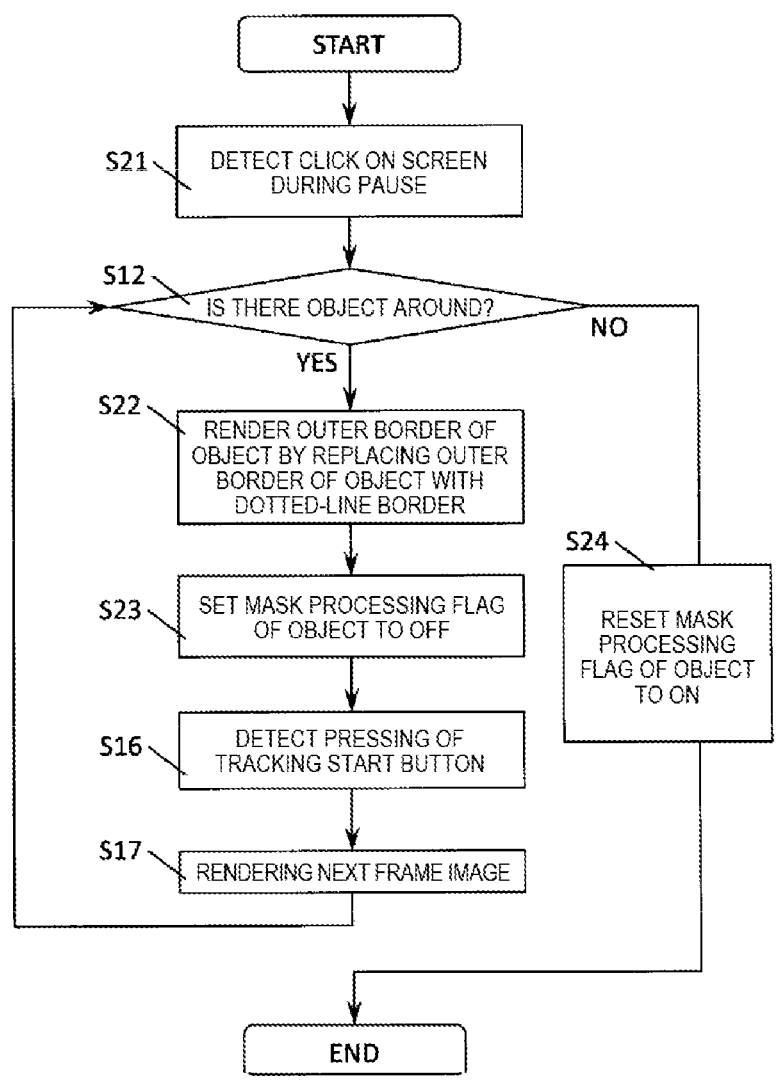
FIG. 12A is a flowchart explaining in detail an example of an operation procedure of the back end server when temporarily deleting objects corresponding to FIG. 9.

FIG. 12A is a flowchart explaining in detail one example of an operation procedure of the back end server when temporarily deleting objects corresponding to FIG. 9. For example, it is assumed that a reproduction operation is performed on the monitoring video data in which one or more objects are set as an object to be masked by an operation of a user of back end server 50 in the method of FIG. 8. In an explanation of FIG. 12A, the same step numbers are given to the same processes as those of FIG. 11, and a description thereof will be simplified or omitted. In the following description, contents different from those of FIG. 11 will be described.

In FIG. 12A, it is assumed that a pause operation is performed by an operation of a user of back end server 50 after the reproduction is started. It is assumed that tracking unit 57 detects a click by a user's operation on a screen on which the first frame image (for example, frame image FR11) among the plurality of frame images constituting the monitoring video is displayed during the pause (S21). By the click, a user selects an object to be temporarily deleted from objects to be masked. Instead of clicking, a touch or a tap by finger FG illustrated in FIG. 9 may be made.

In a case where there is no object around a detection position of the click (that is, tracking unit 57 does not automatically detect an object) (NO in S12), processing of FIG. 12A ends. On the other hand, in a case where there is an object around a detection position of the click (that is, tracking unit 57 automatically detects an object) (YES in S12), tracking unit 57 replaces an outer border (for example, double-line border WK1*s*) superimposed and displayed around the object with double dotted-line border WK1*st* as an example of a display mode in which the object around a detection position of the click can be identified, and displays (renders) the double dotted-line border (S22). Tracking unit 57 updates tracking information 59*a* by temporarily setting a mask processing flag for the object to OFF (S23). The process of step S23 may be performed by mask controller 58.

Here, as in FIG. 11, processes of step S16 and step S17 are performed in order, and after step S17, the process of back end server 50 returns to step S12. Processes of an order of step S22→step S23→S16→step S17 are repeatedly performed until an object around a position clicked in step S11 does not appear in the subsequent frame images rendered in step S17 (that is, tracking unit 57 does not automatically detect an object around the position clicked in step S11). The processes of steps S16 and step S17 may be omitted. That is, it is not always necessary to play the frame image.

FIG. 12B is a flowchart explaining in detail one example of an operation procedure of the back end server when completely deleting objects corresponding to FIG. 10. For example, it is assumed that a reproduction operation is performed on the monitoring video data in which one or more objects are set as an object to be masked by an operation of a user of back end server 50 in the method of FIG. 8. In an explanation of FIG. 12B, the same step numbers are given to the same processes as those of FIG. 11, and a description thereof will be simplified or omitted. In the following description, contents different from those of FIG. 11 will be described.

In FIG. 12B, it is assumed that a pause operation is performed by an operation of a user of back end server 50 after the reproduction is started. It is assumed that tracking unit 57 detects a double click by a user's operation on a screen on which the first frame image (for example, frame image FR11) among the plurality of frame images constituting the monitoring video is displayed during the pause (S11). By the double click, a user selects an object to be completely deleted from objects to be masked. Instead of double-clicking, a double tap by finger FG illustrated in FIG. 10 may be made.

In a case where there is no object around a detection position of the double click (that is, tracking unit 57 does not automatically detect an object) (NO in S12), processing of FIG. 12B ends. On the other hand, in a case where there is an object around a detection position of the double click (that is, tracking unit 57 automatically detects an object) (YES in S12), tracking unit 57 performs deletion of display (non-display) of an outer border (for example, double-line border WK1*s*) displayed around the object at a detection position of the double click (S31). Tracking unit 57 deletes a coordinate indicating a position of the object in the frame image that corresponds to the deleted outer border, and the mask processing flag, from tracking information 59*a*, and further, deletes all of coordinates of the object in other frame images constituting the monitoring video and mask processing flags of the object, from tracking information 59*a* (S32). The process of step S32 may be performed by mask controller 58.

As described above, in monitoring video analysis system 5 according to the second embodiment, a camera such as wearable camera 10 or in-car camera 31 captures a monitoring video related to an incident (for example, a case or an accident). Back end server 50 displays the monitoring video captured by the camera on monitor 52, and reproduces the monitoring video. During pausing of the monitoring video after the monitoring video is reproduced, in accordance with a designation operation (selection operation) of object OB1 appearing in the first frame image (for example, first frame image FR1) among the plurality of frame images constituting the monitoring video, back end server 50 displays designated (selected) object OB1 in a display mode (for example, double-line border WK1*s*) in which object OB1 can be identified as an object to be masked, and stores position information of designated (selected) object OB1 into memory 59 in association with the first frame image. In accordance with a reproduction operation of the monitoring video (for example, a press operation of tracking start button IC1), back end server 50 displays designated (selected)

object OB1 in a display mode (for example, single-line border WK1m) in which object OB1 can be identified as an object to be masked, for each of the frame images subsequent to the first frame image, and stores object position information of designated (selected) object OB1 into memory 59 in association with each frame image. In accordance with reproduction of the monitoring video, back end server 50 continues to reproduce the monitoring video and store the position information of designated (selected) object OB1 into memory 59 until designated (selected) object OB1 does not appear in the frame image.

Accordingly, for each person appearing in a monitoring video captured by a camera, monitoring video analysis system 5 can flexibly set addition of each person as an object to be masked, and support privacy protection of each person in the monitoring video. In addition, monitoring video analysis system 5 reproduces the monitoring video according to a press operation of tracking start button IC1. Thus, a user can visually and clearly recognize a movement state of an object until the object (for example, a face of a person) designated (selected) by a user's operation does not appear in the frame images, and appropriately determine whether or not to include the object as an object to be masked.

In addition, during pausing of the monitoring video, in accordance with a designation operation (selection operation) of object OB1 appearing in the second frame image (for example, first frame image FR11) among the plurality of frame images constituting the monitoring video, back end server 50 displays designated (selected) object OB1 in a display mode (for example, double dotted-line border WK1st) in which object OB1 can be identified as an object to be temporarily excluded from the mask processing. In accordance with a reproduction operation of the monitoring video (for example, a press operation of tracking start button IC1), back end server 50 displays designated (selected) object OB1 in a display mode in which object OB1 can be identified as an object to be temporarily excluded from the mask processing, for each of the frame images subsequent to the second frame image. In accordance with reproduction of the monitoring video, back end server 50 continues to display designated (selected) object OB1 in a display mode in which designated (selected) object OB1 can be identified as an object to be temporarily excluded from the mask processing, until designated (selected) object OB1 does not appear in the frame images.

Accordingly, monitoring video analysis system 5 reproduces the monitoring video during a temporary period until the object (for example, a face of a person), which is set once as an object to be added to the mask processing, does not appear in the frame images. Thus, a user can visually recognize a movement situation of the object during reproduction of the monitoring video, and appropriately determine whether or not to delete the object from objects to be masked.

In addition, during pausing of the monitoring video, in accordance with a designation operation (selection operation) of the object appearing in the third frame image (for example, first frame image FR11) among the plurality of frame images constituting the monitoring video, back end server 50 deletes the position information in all the frame images corresponding to the designated (selected) object. Accordingly, in a case where a user determines that the object (for example, a signboard) in the monitoring video is an object for which the mask processing is unnecessary, the object in the monitoring video being set once as an object to be added to the mask processing, monitoring video analysis system 5 deletes the positional information of the object in all the frames. Thus, there is no need to perform unnecessary mask processing during reproduction of the monitoring video, and thus degradation of the visibility of the monitoring video can be suppressed.

In addition, in accordance with a reproduction operation of the monitoring video, back end server 50 performs the mask processing on designated (selected) object OB1 in each of the frame images constituting the monitoring video, and displays the mask processing result on monitor 52. Accordingly, a user of back end server 50 can specifically recognize a situation where the object selected by the user himself/herself is masked during reproduction of the monitoring video, and appropriately determine whether or not to include the object as an object to be masked or whether or not to delete the object from objects to be masked.

Background to Content of Third Embodiment

Here, in a monitoring video captured by an image capturing device such as a security camera in town or a wearable camera held by a police officer or the like, many people such as ordinary citizens who are not directly related to an incident such as a case or an accident, appear in some cases. In order to protect privacy, it is necessary to perform image processing such as mask processing on a face of each person such that it is difficult to specify who the person is.

However, when performing the image processing such as the above-described mask processing, even though a configuration described in Japanese Patent Unexamined Publication No. 2016-158156 is used, which portion of the video a mask disable area is set preferably and which movement pattern each person moves with vary depending on each monitoring video. Thus, it is difficult to uniformly set the mask disable area and uniformly determine the movement pattern. For this reason, for a plurality of persons such as ordinary citizens who appear in the monitoring video, it is difficult to flexibly set addition of the plurality of persons as an object to be masked.

Therefore, in a third embodiment, for each person appearing in a monitoring video captured by an image capturing apparatus such as wearable camera 10 or in-car camera 31, an example of a monitoring video analysis system that flexibly sets addition of each person as an object to be masked and supports privacy protection of each person in the monitoring video, will be described.

Third Embodiment

An internal configuration of back end server 50 of monitoring video analysis system 5 according to the third embodiment is the same as the internal configuration of back end server 50 of monitoring video analysis system 5 according to the first embodiment, and an explanation will be described with reference to the same reference numerals.

Figure 13:
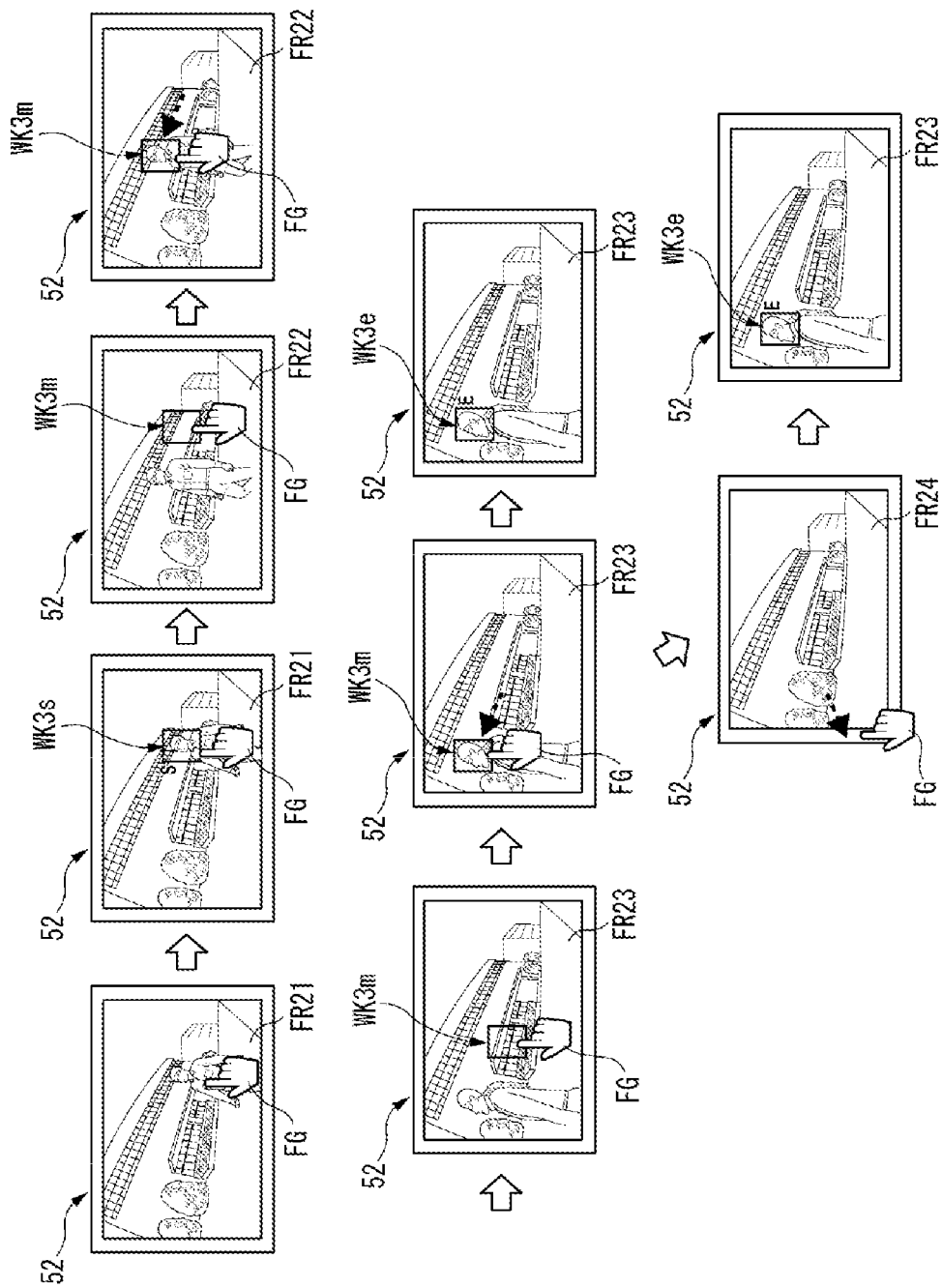
FIG. 13 is a diagram illustrating a display transition example of a frame image when an object to be masked is added by the back end server according to a third embodiment.

FIG. 13 is a diagram illustrating a display transition example of a frame image when an object to be masked is added by back end server 50 according to the third embodiment. For example, it is assumed that a reproduction operation is performed on data of a monitoring video, which is captured by wearable camera 10, by an operation of a user of back end server 50. The data of the monitoring video is imported to back end server 50 via data input unit 53, and is developed, for example, from MP4 format data into H.264 format encoded data by demultiplexer 554. The H.264 format encoded data is converted into non-encoding data such as YUV format data or RGB format data by decoder 552. The non-encoding data is read into a RAM (not illustrated) such as a work memory, and is reproduced by reproduction controller 56. Thus, the non-encoding data is displayed on monitor 52. The monitoring video data which is reproduced by an operation of a user of back end server 50 may be data of a monitoring video in which one or more objects are set as an object to be masked in the first embodiment or the second embodiment.

It is assumed that a pause operation is performed by an operation of a user of back end server 50 after the reproduction is started. Thereafter, by an operation of a user of back end server 50 (for example, a long press operation by finger FG of a user), single object OB3, which is added by the user as an object to be masked, is selected on first frame image FR21 (first frame image) among the plurality of frame images constituting the monitoring video data. Object OB3 is a person. By the selection, mask controller 58 sets a single object as an object to be masked.

Tracking unit 57 displays a single object on monitor 52 by superimposing an outer border (for example, single-line border WK3s) as an example of a display mode in which a single object can be identified, on a portion around object OB3 in frame image FR21. The size of the outer border may be fixed, or may be changed on the spot according to an operation of a user of back end server 50 (for example, a slide operation to upper, lower, left, and right by user's finger 2). Letter "s" is displayed around single-line border WK3s so as to indicate that the border is superimposed and displayed on first frame image FR21. In addition, when a state where object OB3 is selected by a user's operation (that is, a long press state) is continued, similar to a case where tracking start button IC1 is pressed in the second embodiment, tracking unit 57 instructs reproduction controller 56 to restart reproduction of the paused monitoring video (in other words, to display the monitoring video by playing subsequent frame images in order from frame image FR21). Accordingly, reproduction controller 56 can restart reproduction of the monitoring video. In other words, reproduction controller 56 automatically performs playing of the frame images constituting the monitoring video in order, and displays the frame images on monitor 52.

As reproduction of the monitoring video is restarted, object OB3 proceeds, for example, to the left in FIG. 13. In this case, tracking unit 57 displays similar single-line border WK3m around a single object in a frame image which is not the first frame image (for example, frame image FR22 subsequent to frame image FR21). Since frame image FR22 is not first frame image FR21, character "s" is not displayed around single-line border WK3m. In addition, in frame image FR22, the position of object OB3 and the position of single-line border WK3m are misaligned (refer to the one-left drawing from the rightmost drawing of the first stage of FIG. 13). This is because playing (reproduction) of the frame image is restarted due to continuation of a long press operation on single object OB3 in frame image FR21 and object OB3 is moved to the left side of FIG. 13.

By a user's operation (for example, a drag operation by user's finger FG), single-line border WK3m is moved so as to surround single object OB3 (refer to the rightmost drawing of the first stage of FIG. 13). By the user's operation (for example, a drag operation by user's finger FG), tracking unit 57 temporarily stops playing (reproduction) of the frame image during a period for which single-line border WK3m is moved from a position deviated from single object OB3 to a position which allows single-line border WK3m to surround single object OB3.

When the user's operation (for example, a drag operation by user's finger FG) is stopped at an operation destination (drag operation destination) (that is, a movement of user's finger FG stops), tracking unit 57 restart playing (reproduction) of the temporarily stopped frame image. Accordingly, as illustrated in frame image FR23, since single object OB3 further moves in the left direction of FIG. 13, when the drag operation is stopped, a position of single-line border WK3m and a position of single object OB3 are misaligned again (refer to the leftmost drawing of the second stage of FIG. 13).

Similarly, by a user's operation (for example, a drag operation by user's finger FG), single-line border WK3m is moved so as to surround single object OB3 (refer to the one-right drawing from the leftmost drawing of the second stage of FIG. 13). By the user's operation (for example, a drag operation by user's finger FG), tracking unit 57 temporarily stops playing (reproduction) of the frame image during a period for which single-line border WK3m is moved from a position deviated from single object OB3 to a position which allows single-line border WK3m to surround single object OB3.

When the user's operation (for example, a long press operation by user's finger FG) is completed, tracking unit 57 completely ends playing (reproduction) of the frame image that is temporarily stopped, and displays single object OB3, on monitor 52, by superimposing an outer border (for example, single-line border WK3e) as an example of a display mode in which single object OB3 can be identified, on a portion around object OB3 in frame image FR23. Letter "E" is displayed around single-line border WK3e so as to indicate that single object. OB3 is superimposed and displayed on final frame image FR23 among the frame images each in which single object OB3 appears.

In some cases, it is difficult to determine whether or not frame image FR23 is the final frame image among the frame images each in which single object OB3 appears. For example, as illustrated in the third stage of FIG. 13, in an immediately preceding state (specifically, a state illustrated in the one-right drawing from the leftmost drawing of the second stage of FIG. 13), when the user's operation (that is, a drag operation of user's finger FG) is stopped, tracking unit 57 restarts playing of the frame image. For this reason, it is considered that single object OB3 does not appear in frame image FR24 as illustrated in frame image FR24. In this case, when a user's operation (that is, a long press operation by user's finger FG) is ended, or when a movement operation of frame image FR24 to the outside of the screen is performed while a long press operation is continued (for example, a drag operation), tracking unit 57 automatically displays immediately preceding frame image FR23 on monitor 52, displays single-line border WK3e at a position of single object OB3 in frame image FR23, and completely ends playing (reproduction) of the frame image.

In addition, tracking unit 57 automatically detects that a user's operation (for example, a drag operation by user's finger FG) stops at the operation destination (drag operation destination) (that is, a movement of user's finger FG stops), and restarts playing (reproduction) of the frame image that is temporarily stopped. On the other hand, instead of the automatic detection, by another user's operation (for example, a tap operation by user's finger FG2), tracking unit 57 may restart playing (reproduction) of the frame image that is temporarily stopped.

Figure 14:
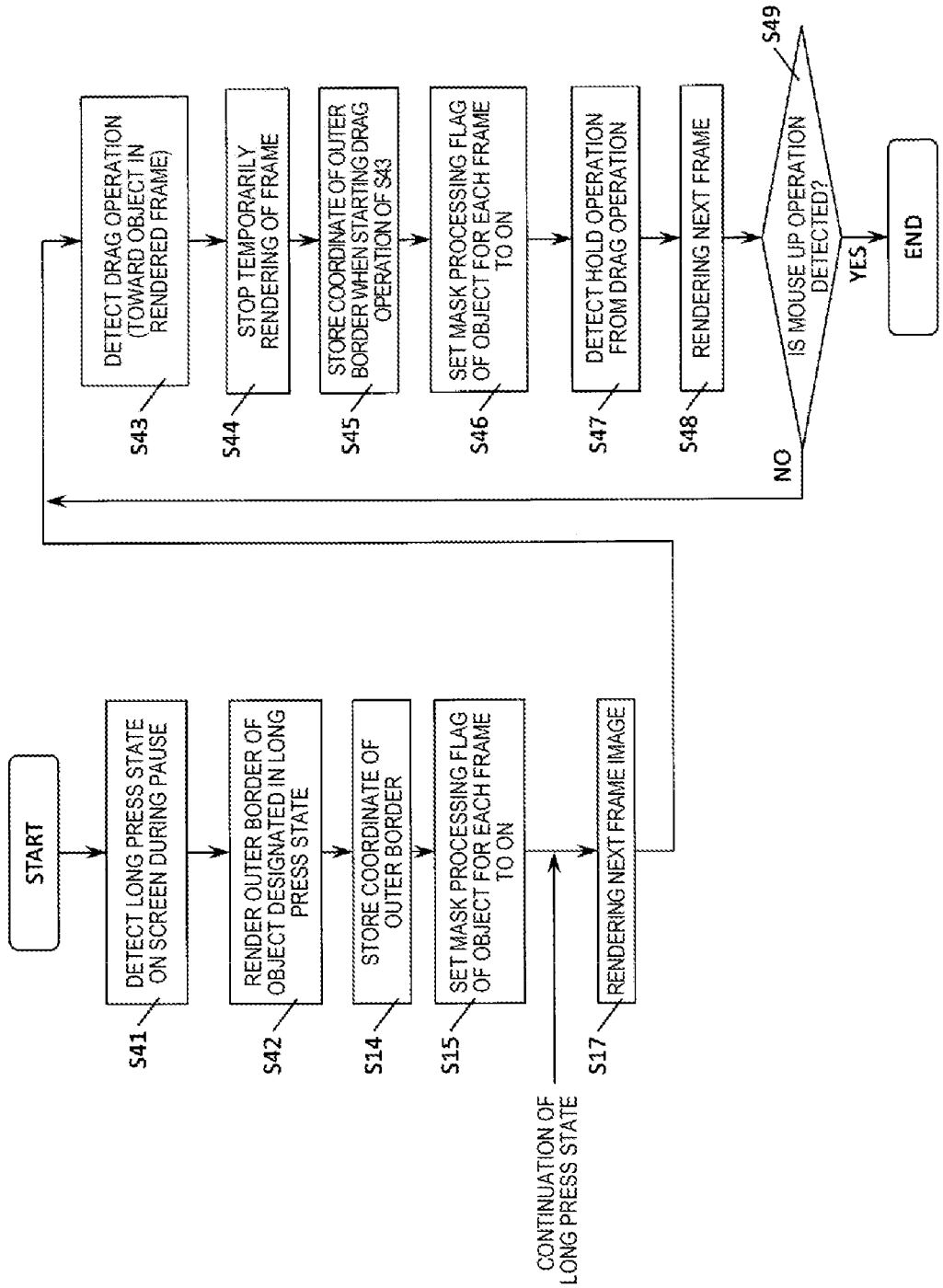
FIG. 14 is a flowchart explaining in detail an example of an operation procedure of the back end server when adding objects corresponding to FIG. 13.

FIG. 14 is a flowchart explaining in detail one example of an operation procedure of back end server 50 when adding objects corresponding to FIG. 13. For example, it is assumed that a reproduction operation is performed on data of a monitoring video, which is captured by wearable camera 10, by an operation of a user of back end server 50.

In FIG. 14, it is assumed that a pause operation is performed by an operation of a user of back end server 50 after the reproduction is started. It is assumed that tracking unit 57 detects a long press operation by a user's operation on a screen on which the first frame image (for example, frame image FR21) among the plurality of frame images constituting the monitoring video is displayed during the pause (S41). By the long press operation, a user selects single object to be added to the mask processing.

Tracking unit 57 displays (renders) a single object designated (selected) in the long press state, on monitor 52, by superimposing an outer border (for example, single-line border WK3s) as an example of a display mode in which a single object can be identified, on a portion around an object (for example, object OB3) in frame image FR21 (S42). Tracking unit 57 stores a coordinate indicating a position of the border in a frame image into memory 59, as tracking information 59a correlated with identification information of the frame image (S14). In addition, tracking unit 57 updates tracking information 59a by setting a mask processing flag for the object to ON (S15). The process of step S15 may be performed by mask controller 58.

When a long press state of object OB3 is continued by a user's operation, tracking unit 57 instructs reproduction controller 56 to restart reproduction of the paused monitoring video (in other words, to display the monitoring video by playing subsequent frame images in order from frame image FR21). Accordingly, reproduction controller 56 can restart reproduction of the monitoring video. In other words, reproduction controller 56 automatically performs playing of the frame images constituting the monitoring video in order, and displays the frame images on monitor 52 (S17). An outer border (for example, single-line border WK3m) is moved by a user's operation (for example, a drag operation by user's finger FG) so as to surround single object OB3 which is moved by playing of the frame image. Tracking unit 57 detects a user's operation (for example, a drag operation by user's finger FG) (S43). Tracking unit 57 temporarily stops playing (reproduction) of the frame image until single-line border WK3m is moved by the drag operation so as to surround single object OB3 which is moved by playing of the frame image (S44).

After step S44, tracking unit 57 stores a coordinate indicating a position of the outer border (for example, single-line border WK3m) in the frame image at the start of the drag operation detected in step S43, into memory 59, as tracking information 59a correlated with identification information of the frame image (S45). In addition, tracking unit 57 updates tracking information 59a by setting a mask processing flag for the object to ON (S46). The process of step S46 may be performed by mask controller 58.

After step S46, when tracking unit 57 detects a user's operation (that is, from a drag operation to a hold operation) (S47), tracking unit 57 instructs reproduction controller 56 to restart playing (reproduction) of the frame image that is temporarily stopped in step S44. Accordingly, reproduction controller 56 can restart reproduction of the monitoring video. In other words, reproduction controller 56 automatically performs playing of the frame images constituting the monitoring video in order, and displays the frame images on monitor 52 (S48). After step S48, in a case where a user's operation (that is, a mouse up operation) is detected by tracking unit 57 (YES in S49), processing of back end server 50 illustrated in FIG. 14 ends. On the other hand, in a case where a user's operation (that is, a mouse up operation) is not detected by tracking unit 57 (NO in S49), the process of back end server 50 returns to step S43, and processes of steps S43 to S49 are repeatedly performed until a user's operation (that is, a mouse up operation) is detected by tracking unit 57. The mouse-up operation is an example of a process performed, for example, in a case where a user stops a process of adding a single object designated by the user as an object to be masked.

As described above, in monitoring video analysis system 5 according to the third embodiment, a camera such as wearable camera 10 or in-car camera 31 captures a monitoring video related to an incident (for example, a case or an accident). Back end server 50 displays the monitoring video captured by the camera on monitor 52, and reproduces the monitoring video. During pausing of the monitoring video after the monitoring video is reproduced, in accordance with a designation operation (selection operation) of single object OB3 appearing in the first frame image (for example, first frame image FR21) among the plurality of frame images constituting the monitoring video, back end server 50 displays designated (selected) single object OB3 in a display mode (for example, single-line border WK3s) in which object OB3 can be identified as an object to be masked, stores position information of designated (selected) single object OB3 into memory 59 in association with the first frame image, and restart playing of the monitoring video. In accordance with reproduction of the monitoring video, by a designation operation (selection operation) of designated (selected) single object OB3, back end server 50 displays designated (selected) single object OB3 in a display mode (for example, single-line border WK3m) in which single object OB3 can be identified as an object to be masked, for each of the frame images subsequent to the first frame image, and stores position information of designated (selected) single object OB3 into memory 59 in association with each frame image. In accordance with reproduction of the monitoring video, back end server 50 continues to reproduce the monitoring video and store the position information of designated (selected) single object OB3 into memory 59 until designated (selected) single object OB3 does not appear in the frame images.

Accordingly, for each person appearing in a monitoring video captured by a camera, monitoring video analysis system 5 can flexibly set addition of each person as an object to be masked, and support privacy protection of each person in the monitoring video. In addition, monitoring video analysis system 5 can start reproduction of the monitoring video by continuing to designate (select) an object (for example, a person) appearing in the frame image being paused by a long press operation. Thus, a user can visually and clearly recognize a movement state of an object until the object (for example, a face of a person) designated (selected) by the long press operation does not appear in the frame images, and appropriately determine whether or not to include the object as an object to be masked.

In addition, back end server 50 pauses playing of the monitoring video during a period for which a designated (selected) single object (for example, object OB3) appearing in the first frame image is moved while maintaining a designated state at the designation position (selection position), from the designation position to a position at which the designated (selected) single object is moved by reproduction start of the monitoring video (for example, a drag operation is performed from a position at which single object OB3 is designated to a position at which single object OB3 is moved by reproduction of the frame image). Accordingly, monitoring video analysis system 5 can quickly and accurately perform a drag operation to a position at which the single object is moved by playing of the frame image, and thus early perform processing of adding the single object as an object to be masked without waste of time.

In addition, during reproduction of the monitoring video, back end server 50 performs the mask processing on designated (selected) single object (for example, object OB3) in each of the frame images constituting the monitoring video, and displays the mask processing result on monitor 52. Accordingly, a user of back end server 50 can specifically recognize a situation where single object OB3 selected by the user himself/herself is masked during reproduction of the monitoring video, and appropriately determine whether or not to include single object OB3 as an object to be masked.

Modification Example of Third Embodiment

In the third embodiment, an example in which a user designates (selects) a single object to be added to the mask processing from the captured video, is described. In a modification example of the third embodiment, on contrary to the third embodiment, an example in which a user designates (selects) a single object to be excluded from the mask processing, from a captured video in which all the frame images are masked in advance, is described. An internal configuration of back end server 50 of monitoring video analysis system 5 according to the modification example of the third embodiment is the same as the internal configuration of back end server 50 of monitoring video analysis system 5 according to the first embodiment, and an explanation will be described with reference to the same reference numerals.

FIG. 15 is a diagram illustrating a display transition example of a frame image when an object not to be masked is added by back end server 50 according to the modification example of the third embodiment. For example, the data of the monitoring video captured by wearable camera 10 is imported to back end server 50 via data input unit 53, and is developed, for example, from MP4 format data into H.264 format encoded data by demultiplexer 554. The H.264 format encoded data is converted into non-encoding data such as YUV format data or RGB format data by decoder 552, and the non-encoding data is read into a RAM (not illustrated) such as a work memory. Here, masking unit 555 of back end server 50 performs mask processing on data of all the frame images constituting the monitoring video. When a reproduction operation is performed on the data of the masked monitoring video by an operation of a user of the back end server 50, the data is reproduced by reproduction controller 56 and is displayed on monitor 52. The monitoring video data which is reproduced by an operation of a user of back end server 50 may be data of a monitoring video in which one or more objects are set as an object to be masked in the first embodiment to the third embodiment.

It is assumed that, after mask processing is performed on all the frame images constituting the monitoring video in advance and reproduction of the data of the masked monitoring video is started, a pause operation is performed by an operation of a user of back end server 50. Thereafter, by an operation of a user of back end server 50 (for example, a tap operation by user's finger FG), single object OB7 that the user wants to add as an object not to be masked (in other words, the user wants to exclude from mask processing) is selected in first frame image FR31 (first frame image) among the plurality of frame images constituting the monitoring video data. Object OB7 is a person. By the selection, mask controller 58 sets a single object as an object to be masked.

Tracking unit 57 displays a single object on monitor 52 by superimposing an outer border (for example, single-line border WK7) as an example of a display mode in which a single object can be identified, on a portion around object OB7 in frame image FR31. In addition, when a state where object. OB7 is selected by a user's operation (that is, a long press state) is continued, similar to a case where tracking start button IC1 is pressed in the second embodiment, tracking unit 57 instructs reproduction controller 56 to restart reproduction of the paused monitoring video (in other words, to display the monitoring video by playing subsequent frame images in order from frame image FR31). Accordingly, reproduction controller 56 can restart reproduction of the monitoring video. In other words, reproduction controller 56 automatically performs playing of the frame images constituting the monitoring video in order, and displays the frame images on monitor 52.

By playing restart of the monitoring video, object OB7 moves. By a user's operation (for example, a drag operation by user's finger FG), single-line border WK7 is moved so as to surround single object OB7 (refer to frame image FR32). Tracking unit 57 displays single object OB7 designated (selected) by a user's operation (for example, a drag operation by user's finger FG), on monitor 52, by superimposing an outer border (for example, single-line border WK7) as an example of a display mode in which a single object can be identified, on a portion around object. OB7 in frame image FR32. Further, mask controller 58 performs processing of releasing mask processing on object OB7, by adding object OB7 as an object not to be masked (in other words, by excluding object OB7 from mask processing). Accordingly, in frame image FR32, object OB7 becomes object OB7$n$, and is obtained as an image of a clear person.

FIG. 16 is a flowchart explaining in detail one example of an operation procedure of back end server 50 when adding objects corresponding to FIG. 15. As a premise of the description of FIG. 16, masking unit 555 of back end server 50 performs mask processing on data of all the frame images constituting the monitoring video. When a reproduction operation is performed on the data of the masked monitoring video by an operation of a user of the back end server 50, the data is reproduced by reproduction controller 56 and is displayed on monitor 52.

In FIG. 16, it, is assumed that a pause operation is performed by an operation of a user of back end server 50 after the reproduction is started. It is assumed that tracking unit 57 detects a long press operation by a user's operation on a screen on which the first frame image (for example, frame image FR31) among the plurality of frame images constituting the monitoring video is displayed during the pause (S41). By the long press operation, a user selects single object OB7 that the user wants to add as an object not to be masked (in other words, the user wants to delete from objects to be masked).

Tracking unit 57 displays (renders) a single object designated (selected) in the long press state, on monitor 52, by superimposing an outer border (for example, single-line border WK7) as an example of a display mode in which a single object can be identified, on a portion around an object (for example, object OB7) in frame image FR31 (S42). Tracking unit 57 stores a coordinate indicating a position of the border in a frame image into memory 59, as tracking information 59$a$ correlated with identification information of the frame image (S14). In addition, tracking unit 57 updates tracking information 59a by setting a mask processing flag for the object to OFF (S15A). The process of step S15A may be performed by mask controller 58. In the modification of the third embodiment, "mask processing flag ON" according to the third embodiment is replaced with "mask processing exclusion flag ON", and "mask processing flag OFF" according to the third embodiment is replaced with "mask processing exclusion flag OFF".

When a long press state of object OB7 is continued by a user's operation, tracking unit 57 instructs reproduction controller 56 to restart reproduction of the paused monitoring video (in other words, to display the monitoring video by playing subsequent frame images in order from frame image FR31).

Accordingly, reproduction controller 56 can restart reproduction of the monitoring video. In other words, reproduction controller 56 automatically performs playing of the masked frame images constituting the monitoring video in order, and displays the frame images on monitor 52 (S17A). An outer border (for example, single-line border WK7) is moved by a user's operation (for example, a drag operation by user's finger FG) so as to surround single object OB7 which is moved by playing of the masked frame image. Tracking unit 57 detects a user's operation (for example, a drag operation by user's finger FG) (S43). Tracking unit 57 temporarily stops playing (reproduction) of the masked frame image until single-line border WK7 is moved by the drag operation so as to surround single object OB7 which is moved by playing of the masked frame image (S44).

After step S44, tracking unit 57 stores a coordinate indicating a position of the outer border (for example, single-line border WK7) in the frame image at the start of the drag operation detected in step S43, into memory 59, as tracking information 59a correlated with identification information of the frame image (S45). In addition, tracking unit 57 updates tracking information 59a by setting a mask processing flag for the object to OFF (S46A). The process of step S46A may be performed by mask controller 58.

After step S46A, when tracking unit 57 detects a user's operation (that is, from a drag operation to a hold operation) (S47), tracking unit 57 instructs reproduction controller 56 to restart playing (reproduction) of the masked frame image that is temporarily stopped in step S44. Accordingly, reproduction controller 56 can restart reproduction of the monitoring video. In other words, reproduction controller 56 automatically performs playing of the masked frame images constituting the monitoring video in order, and displays the frame images on monitor 52 (S48A). After step S48A, in a case where a user's operation (that is, a mouse up operation) is detected by tracking unit 57 (YES in S49), processing of back end server 50 illustrated in FIG. 16 ends. On the other hand, in a case where a users operation (that is, a mouse up operation) is not detected by tracking unit 57 (NO in S49), the process of back end server 50 returns to step S43, and processes of steps S43 to S49 are repeatedly performed until a user's operation (that is, a mouse up operation) is detected by tracking unit 57.

As described above, in monitoring video analysis system 5 according to the modification example of the third embodiment, a camera such as wearable camera 10 or in-car camera 31 captures a monitoring video related to an incident (for example, a case or an accident). Back end server 50 performs mask processing on all the frame images constituting the monitoring video captured by the camera, displays the mask processing result on monitor 52, and reproduces the masked frame images. During pausing of the monitoring video, in accordance with a designation operation (selection operation) of a single object (for example, object OB7) appearing in the first frame image (for example, frame image FR31) among the plurality of frame images constituting the monitoring video, back end server 50 displays designated (selected) single object. OB7 in a display mode in which object OB7 can be identified as an object not to be masked, stores position information of designated (selected) single object OB7 into memory 59 in association with the first frame image, and restart playing of the monitoring video. In accordance with reproduction of the monitoring video, by a designation operation (selection operation) of a designated (selected) single object, back end server 50 displays the designated (selected) single object in a display mode in which the single object can be identified as an object not to be masked, for each of the frame images subsequent to the first frame image, and stores position information of the designated (selected) single object into memory 59 in association with each frame image. In accordance with reproduction of the monitoring video, back end server 50 continues to reproduce the monitoring video and store the position information of the designated (selected) single object into memory 59 until the designated (selected) single object does not appear in the frame images.

Accordingly, in a case where it is necessary to clarify a person appearing in the frame image of the monitoring video which is captured by the camera and on which mask processing is performed, monitoring video analysis system 5 can flexibly set addition of the person as an object not to be masked, and support video analysis capable of clarifying behavior of the person of interest in the monitoring video. In addition, monitoring video analysis system 5 can start, reproduction of the monitoring video by continuing to designate (select) an object (for example, a person) appearing in the frame image being paused by a long press operation. Thus, a user can visually and clearly recognize a movement state of an object until the object (for example, a person) designated (selected) by the long press operation does not appear in the frame images, and appropriately determine whether or not to exclude the object from objects to be masked.

In addition, back end server 50 pauses playing of the monitoring video during a period for which a designated (selected) single object (for example, object OB7) appearing in the first frame image is moved while maintaining a designated state at the designation position (selection position), from the designation position to a position at which the designated (selected) single object is moved by reproduction start of the monitoring video (for example, a drag operation is performed from a position at which single object OB7 is designated to a position at, which single object OB3 is moved by reproduction of the frame image). Accordingly, monitoring video analysis system 5 can quickly and accurately perform a drag operation to a position at, which the single object is moved by playing of the frame image, and thus early perform processing of adding the single object as an object to be masked without waste of time.

In addition, during reproduction of the monitoring video, back end server 50 performs non-mask processing on a designated (selected) single object in each of the frame images constituting the monitoring video, and displays the non-mask processing result on monitor 52. Accordingly, a user of back end server 50 can specifically recognize a situation where single object OB7 selected by the user himself/herself is not masked during reproduction of the monitoring video on which mask processing is performed in advance (in other words, a situation where single object OB7 becomes a clear image), and appropriately determine whether or not to include single object OB7 as an object not to be masked.

Although the embodiments have been described with reference to the drawings, the present disclosure is not limited to the examples. It is clear for those skilled in the art that various modifications or alterations can be made hereto without departing from the spirit and scope of the present invention. In addition, it should be understood by those skilled in the art that the various modifications or alterations are included in the scope of the present disclosure. Further, each component disclosed in the embodiments can be appropriately combined with each other without departing from the spirit of the present disclosure.

For example, in the first embodiment, a border surrounding an object which is determined as an object to be masked by a police officer, is indicated by a dotted-line border, and a border surrounding an automatically extracted object is indicated by a solid-line border with a different display mode from that of the dotted-line border. The display modes are merely examples, and various settings can be made. For example, a thick dotted-line border, a thin dotted-line border, a one-dotted-line border, a two-dotted-line border, a color border such as a red border or a blue border, and the like may be set. Further, a border surrounding an object which is newly added as a candidate for the mask processing by a user may also be displayed in a display mode different from that of the border surrounding the automatically extracted object.

In addition, in the above-described first embodiment, although back end server has a face recognition function of recognizing a face of a person from the captured video, wearable camera may have a face recognition function, or may add face recognition information to the video data files.

In addition, in the above-described first embodiment, a case where there are a plurality of objects and a video in which at least one of the plurality of objects appears is tracked, is described. On the other hand, a video in which all of the plurality of objects appear may be tracked, or a video in which at least specific objects selected by the user appear may be tracked.

In addition, in the above-described first embodiment, a case where an object is a face is described. On the other hand, an object may be an appearance of a person, a signboard, a number plate of a vehicle, or the like, in addition to a face. In this case, back end server 50 has a function of recognizing the object in each frame.

In addition, in the above-described first embodiment, a size of a frame surrounding an object is changed according to a size of a face. On the other hand, the size of the frame may be a predetermined size such that a processing load can be reduced. In this case, when the plurality of objects are close to each other, these frames may be displayed partially overlapping with each other in some cases.

In addition, in the above-described first embodiment, a case where the wearable camera which is held or possessed by the police officer captures a video is described. On the other hand, even in a case of capturing a video using the In-car video system (ICV) mounted on a police patrol car, the present disclosure can be similarly applied to the case.

What is claimed is:

1. A monitoring video analysis system comprising:
a camera; and
a server that receives a video having a plurality of frames captured by the camera,
wherein the server
receives, from a user, an input indicating an input position in a first frame of the plurality of frames constituting the received video,
detects at least one object appearing in a proximity of the indicated input position in subsequent frames, after the first frame, of the plurality of frames constituting the received video,
stores position information of the at least one object detected for each frame of the subsequent frames of the received video,
displays, on a monitor, the at least one object in a double line border in the first frame before tracking,
displays, on the monitor, the at least one object in a single line border in the subsequent frames after tracking,
in response to receiving user selection of the double line border, refrains from performing mask processing on the at least one object in all the subsequent frames, and
in response to receiving user selection of the single line border in one frame of the subsequent frames, refrains from performing the mask processing on the at least one object in the one frame of the subsequent frames in which the single line border is selected.

2. The system of claim 1, wherein if the server does not detect an object appearing in the proximity of the indicated input position, the server displays a region in the proximity of the indicated input position in an identifiable display mode.

3. The system of claim 2, wherein the server does not perform the mask processing in the display mode, the mask processing making an object unrecognizable.

4. A monitoring video analysis method of a monitoring video analysis system including a camera and a server that receives a video captured by the camera, the method causing the server to:
receive a video having a plurality of frames captured by the camera;
receive, from a user, an input indicating an input position in a first frame of the plurality of frames constituting the received video,
detect at least one object appearing in a proximity of the indicated input position in subsequent frames, after the first frame, of the plurality of frames constituting the received video,
store position information of the at least one object detected for each frame of the subsequent frames of the received video,
display, on a monitor, the at least one object in a double line border in the first frame before tracking,
in response to receiving user selection of the double line border, refrain from performing mask processing on the at least one object in all the subsequent frames, and
in response to receiving user selection of the single line border in one frame of the subsequent frames, refrain from performing the mask processing on the at least one object in the one frame of the subsequent frames in which the single line border is selected.

5. A monitoring video analysis system, comprising:
a camera that is used by a user; and
a server that receives a video having a plurality of frames captured by the camera,
wherein the server
receives, from a user, an input indicating an input position in a first frame of the plurality of frames constituting the received video, detects at least one object appearing in a proximity of the indicated input position in subsequent frames, after the first frame, of the plurality of frames constituting the received video, stores position information of the at least one object detected for each frame of the subsequent frames of the received video, displays, on a monitor, the at least one object in a first border type in the first frame before tracking, displays, on the monitor, the at least one object in a second border type, different from the first border type, in the subsequent frames after tracking, in response to receiving user selection the first border type, refrains from performing mask processing on the at least one object in all the subsequent frames, and in response to receiving user selection of the second border type in one frame of the subsequent frames, refrains from performing the mask processing on the at least one object in the one frame of the subsequent frames in which the second border type is selected.

6. The system of claim 5, wherein if the server does not detect an object appearing in the proximity of the indicated input position, the server displays a region in the proximity of the indicated input position in an identifiable display mode.

7. The system of claim 6, wherein the server does not perform the mask processing in the display mode, the mask processing making an object unrecognizable.

* * * * *